United States Patent
Katsurahira

(10) Patent No.: US 11,513,640 B2
(45) Date of Patent: Nov. 29, 2022

(54) POSITION INDICATOR, POSITION INDICATING DEVICE, AND DETECTION METHOD OF TILT OF POSITION INDICATOR

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 297 days.

(21) Appl. No.: 16/855,733

(22) Filed: Apr. 22, 2020

(65) Prior Publication Data
US 2020/0249792 A1    Aug. 6, 2020

Related U.S. Application Data

(63) Continuation of application No. PCT/JP2018/030382, filed on Aug. 16, 2018.

(30) Foreign Application Priority Data

Oct. 25, 2017    (JP) .............................. JP2017-206107

(51) Int. Cl.
*G06F 3/044*    (2006.01)
*G01C 9/06*    (2006.01)
*G01D 5/24*    (2006.01)

(52) U.S. Cl.
CPC ............. *G06F 3/0441* (2019.05); *G01C 9/06* (2013.01); *G01D 5/2405* (2013.01); *G01C 2009/062* (2013.01)

(58) Field of Classification Search
CPC ...... G06F 3/0441; G01D 5/2405; G01C 9/06; G01C 2009/062

(Continued)

(56) References Cited

U.S. PATENT DOCUMENTS 5,736,980 A    4/1998    Iguchi et al.
2014/0043301 A1*    2/2014    Katsurahira ......... G06F 3/0446
345/179

(Continued)

FOREIGN PATENT DOCUMENTS

JP    7-319603 A    12/1995
JP    2011-164801 A    8/2011

(Continued)

OTHER PUBLICATIONS

International Search Report, dated Sep. 18, 2018, for International Application No. PCT/JP2018/030382, 1 page.

*Primary Examiner* — Lee E Rodak
*Assistant Examiner* — Rahul Maini
(74) *Attorney, Agent, or Firm* — Seed IP Law Group LLP

(57) ABSTRACT

A position indicator includes a housing and a first electrode and a second electrode disposed on a side of one end of the housing and a signal generating circuit which, in operation, generates a signal supplied to at least the first electrode. A capacitive interaction between the first electrode and a sensor of a position detecting device formed through supply of the signal to the first electrode. The second electrode surrounds the first electrode and the first electrode is partially exposed from the second electrode in an axial direction of the housing. The position indicator includes a signal transmission control circuit that is coupled to the second electrode and that, in operation, controls the second electrode to change the capacitive interaction between the first electrode and the sensor formed through supply of the signal from the signal generating circuit to the first electrode.

13 Claims, 16 Drawing Sheets

(58) Field of Classification Search
USPC .......................................................... 324/671
See application file for complete search history.

(56) References Cited

U.S. PATENT DOCUMENTS

| | | | |
|---|---|---|---|
| 2015/0277595 A1* | 10/2015 | King-Smith | .......... G06F 3/0446 |
| | | | 345/177 |
| 2016/0188016 A1* | 6/2016 | Munakata | ............. G06F 3/0446 |
| | | | 345/179 |
| 2018/0232070 A1 | 8/2018 | Katsurahira | |
| 2018/0246585 A1 | 8/2018 | Hara | |
| 2018/0314350 A1 | 11/2018 | Oda et al. | |
| 2019/0050072 A1 | 2/2019 | Munakata et al. | |

FOREIGN PATENT DOCUMENTS

| | | |
|---|---|---|
| JP | 2014-35631 A | 2/2014 |
| JP | 2015-222518 A | 12/2015 |
| JP | 2016-126503 A | 7/2016 |

\* cited by examiner

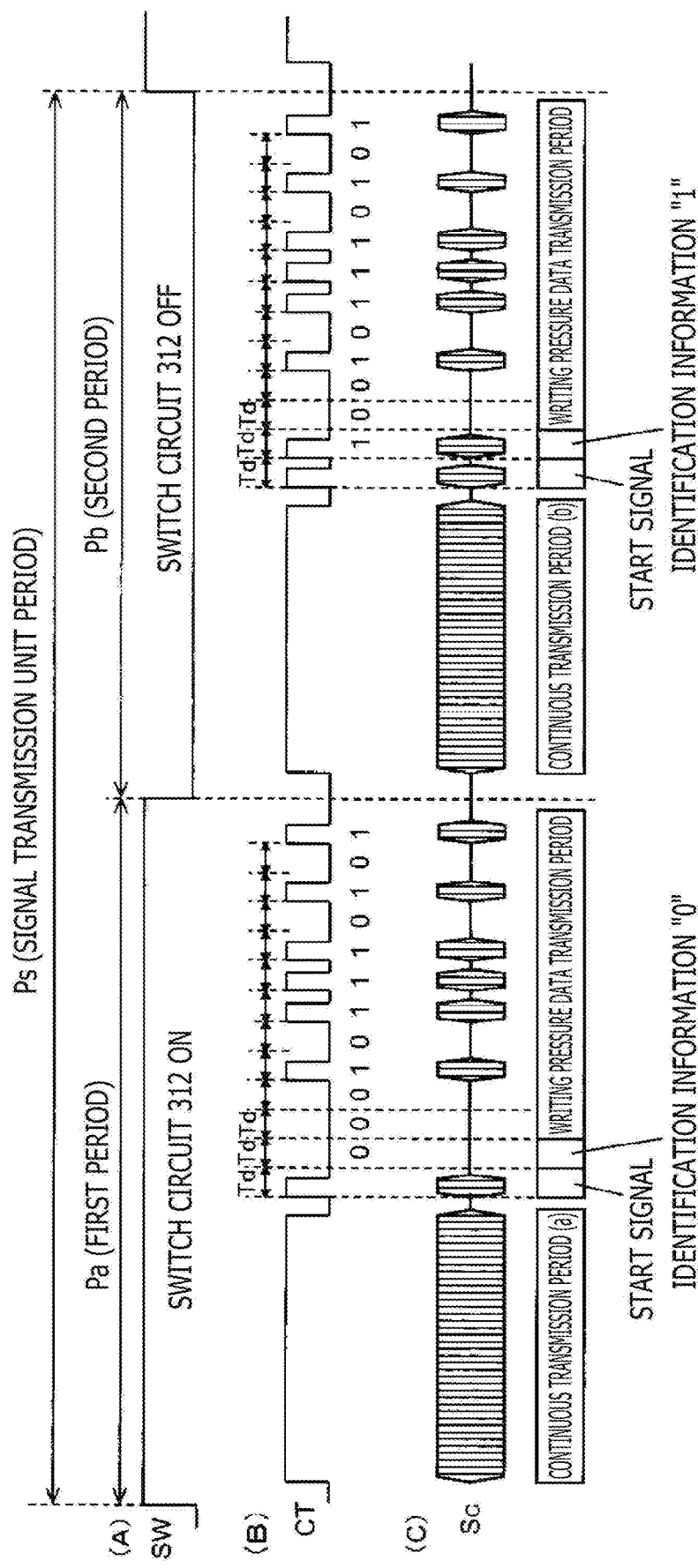

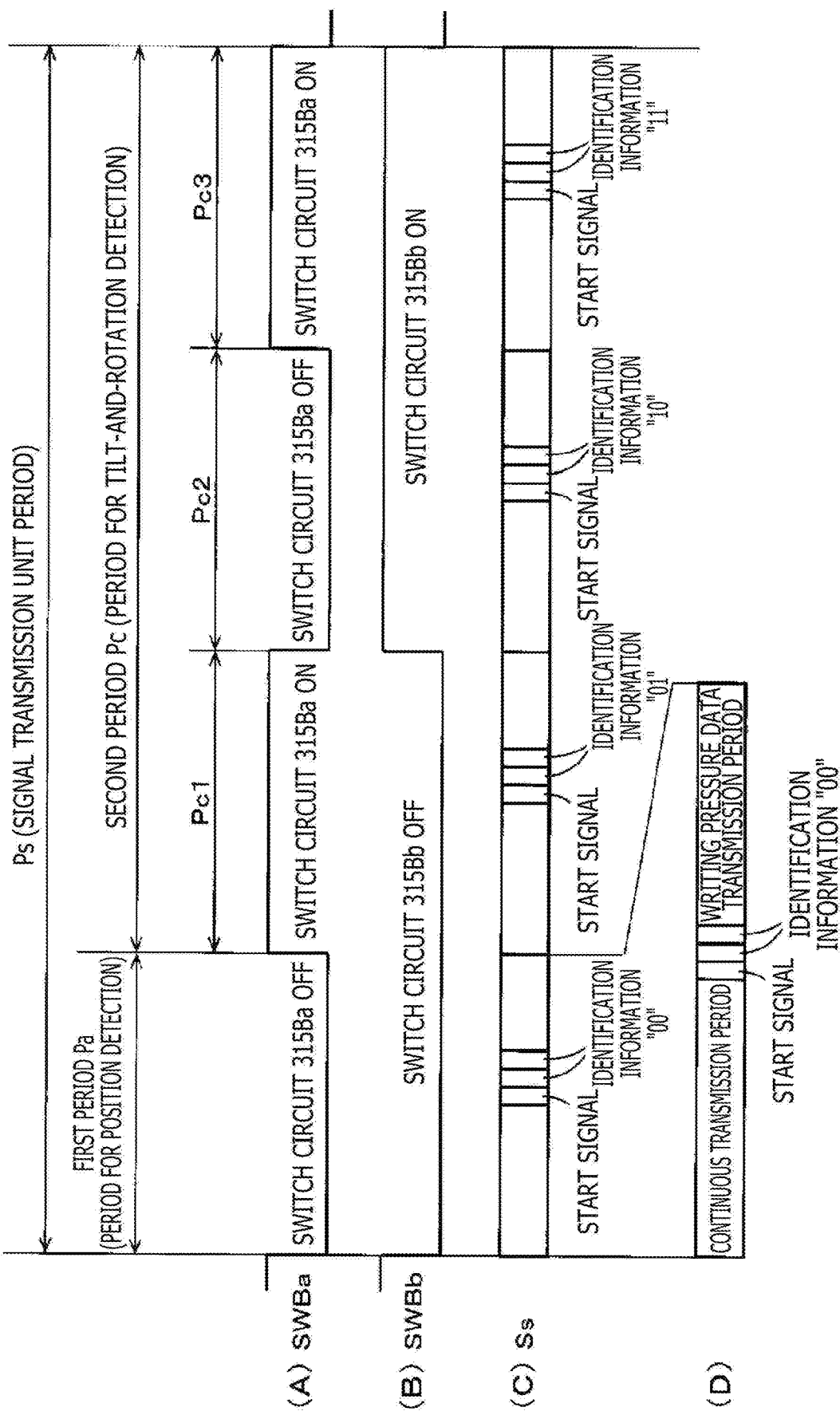

FIG. 16

| PERIOD | IDENTIFICATION INFORMATION | SWITCH CIRCUIT 315Ba | SWITCH CIRCUIT 315Bb | OBTAINED COORDINATE POSITION |
|---|---|---|---|---|
| Pa | 00 | OFF | OFF | PEN TIP POSITION |
| Pc1 | 01 | ON | OFF | COORDINATE POSITION THAT IS SHIFTED IN DIRECTION OF PERIPHERAL ELECTRODE 7Ba AND IS ACCORDING TO DIRECTION AND MAGNITUDE OF INCLINATION IS OBTAINED |
| Pc2 | 10 | OFF | ON | COORDINATE POSITION THAT IS SHIFTED IN DIRECTION OF PERIPHERAL ELECTRODE 7Bb AND IS ACCORDING TO DIRECTION AND MAGNITUDE OF INCLINATION IS OBTAINED |
| Pc3 | 11 | ON | ON | COORDINATE POSITION SHIFTED IN INCLINATION DIRECTION IS OBTAINED ACCORDING TO TILT ANGLE OF PEN |

# POSITION INDICATOR, POSITION INDICATING DEVICE, AND DETECTION METHOD OF TILT OF POSITION INDICATOR

BACKGROUND

Technical Field

This disclosure relates to a position indicator of a capacitive system that carries out capacitive interaction with a sensor of a position detecting device, a position indicating device, and a detection method of the tilt of a position indicator.

Background Art

As this kind of position indicator of a capacitive system, an active capacitive pen is known in which a position indicator includes a signal generating circuit and a signal from this signal generating circuit is transmitted to a sensor of a position detecting device through an electrically-capacitive core body based on capacitive coupling. In this case, in the position detecting device, the signal from the active capacitive pen is received by a sensor in which plural sensor conductors are disposed. Furthermore, in the position detecting device, a position over the sensor indicated by the pen tip of the core body of the active capacitive pen is detected according to a signal level from the sensor conductor that has received the signal.

By the way, in the position detecting device, it is possible to detect the position indicated by the pen tip of the core body substantially correctly when the direction of the central axis of the core body of the position indicator is in the state of being perpendicular (in the state of being not tilted) with respect to an input surface of the sensor. However, there is a problem that it is impossible to correctly detect the position indicated by the pen tip of the core body when the direction of the central axis of the core body of the position indicator is in the state of being tilted with respect to the input surface of the sensor.

So, in recent years, it has been proposed to, in a position detecting device, detect the tilt of the direction of the central axis of a core body of a position indicator with respect to an input surface of a sensor (hereinafter, abbreviated as the tilt of the position indicator) and correct the position indicated by the pen tip of the core body of the position indicator based on the direction and magnitude (tilt angle) of the detected tilt. Furthermore, it has also been proposed to execute various kinds of processing by using information on the detected tilt of the position indicator. For example, in the case of writing with a pencil or the like, the boldness of a line of a writing trace changes according to the tilt of the position indicator with respect to the plane of paper. It has also been proposed to, also in the case of a linear locus based indication input by a position indicator, change the boldness of the linear locus according to the tilt angle of the position indicator.

From the above background, a position indicator configured to allow detection of the tilt angle of the direction of the central axis of a core body with respect to an input surface of a sensor in a position detecting device has been conventionally provided (refer to, for example, Patent Document 1 (Japanese Patent Laid-open No. 2014-35631) and Patent Document 2 (Japanese Patent Laid-open No. 2015-222518)).

FIG. 20 is an example of a detecting circuit of the tilt of the position indicator disclosed in Patent Document 1. In this example, three electrodes 1001, 1002, and 1003 are disposed to surround a core body (diagrammatic representation is omitted) of the position indicator. Furthermore, based on control by a control circuit 1010, a signal from a signal generating circuit 1000 is supplied to these three electrodes 1001, 1002, and 1003 with switching by a switching circuit 1004. In this case, the configuration is made in such a manner that which of the three electrodes 1001, 1002, and 1003 of the position indicator the signal has been received from can be identified in the position detecting device through exchanging signals between the position indicator and the position detecting device.

In the position detecting device, the tilt angle and rotation angle of the position indicator are detected by receiving the signal from the three electrodes 1001, 1002, and 1003 from the position indicator and detecting the reception output power thereof. In FIG. 20, 1011 is a battery as a supply source of a supply voltage for the control circuit 1010 and the signal generating circuit 1000 and a supply voltage VP is supplied to other respective units of the position indicator through a DC/DC converter 1012.

PRIOR ART DOCUMENT

Patent Documents

Patent Document 1: Japanese Patent Laid-open No. 2014-35631
Patent Document 2: Japanese Patent Laid-open No. 2015-222518

BRIEF SUMMARY

Technical Problem

However, in the detecting circuit of the tilt of the position indicator in FIG. 20, there is a problem that the capacitance of the signal output (capacitance in switching by the switch circuit 1004) becomes high and the current consumption becomes large because of the configuration in which a signal is directly supplied to the three electrodes 1001, 1002, and 1003 with switching by the switch circuit 1004 and is transmitted.

This disclosure intends to provide a position indicator configured to be capable of solving the above problems.

Technical Solution

In order to solve the above-described problems, a position indicator is provided that includes a housing, a first electrode and a second electrode disposed on the side of one end of the housing, wherein the second electrode surrounds the first electrode and the first electrode is partly exposed from the second electrode in an axial direction of the housing; and a signal generating circuit which, in operation, generates a signal supplied to at least the first electrode, a capacitive interaction between the first electrode and a sensor of a position detecting device being formed through supply of the signal to the first electrode; and a signal transmission control circuit that is coupled to the second electrode and that, in operation, controls the second electrode to change the capacitive interaction between the first electrode and the sensor formed through supply of the signal from the signal generating circuit to the first electrode.

According to the position indicator with the above-described configuration, the region range over the sensor in which an alternating-current signal sent out from a core body to the sensor is detected by the sensor can be changed by the signal transmission control circuit. Furthermore, for example, a period in which the position indicated by the position indicator is detected by the position detecting device is defined as a first period and a period in which the tilt of the position indicator is detected is defined as a second period. The tilt angle of the position indicator can be detected by controlling the region range over the sensor in which the alternating-current signal sent out from the core body to the sensor is detected by the sensor by the signal transmission control circuit in such a manner that the region range in the second period becomes larger than the region range in the first period.

Moreover, in the position indicator with this configuration, the region over the sensor in which the alternating-current signal sent out from the core body to the sensor is detected by the sensor is changed by the signal transmission control circuit, and the signal from the signal generating circuit is not supplied to one or plural peripheral conductors disposed to surround the core body with switching. Therefore, the current consumption in the position indicator is allowed to be low and the problem that the current consumption becomes high as in Patent Document 1 and Patent Document 2 can be suppressed.

BRIEF DESCRIPTION OF THE DRAWINGS

FIG. 6 is a diagram for explaining a signal sent out from the first embodiment of the position indicator according to this disclosure.

FIG. 14 is a diagram for explaining a signal sent out from the position indicator according to the third embodiment of this disclosure.

FIG. 16 is a diagram for explaining processing operation in the position indicator according to the third embodiment of this disclosure.

MODES FOR CARRYING OUT THE DISCLOSURE

Embodiments of the position indicator according to this disclosure will be described below with reference to the drawings.

First Embodiment

Figure 1:
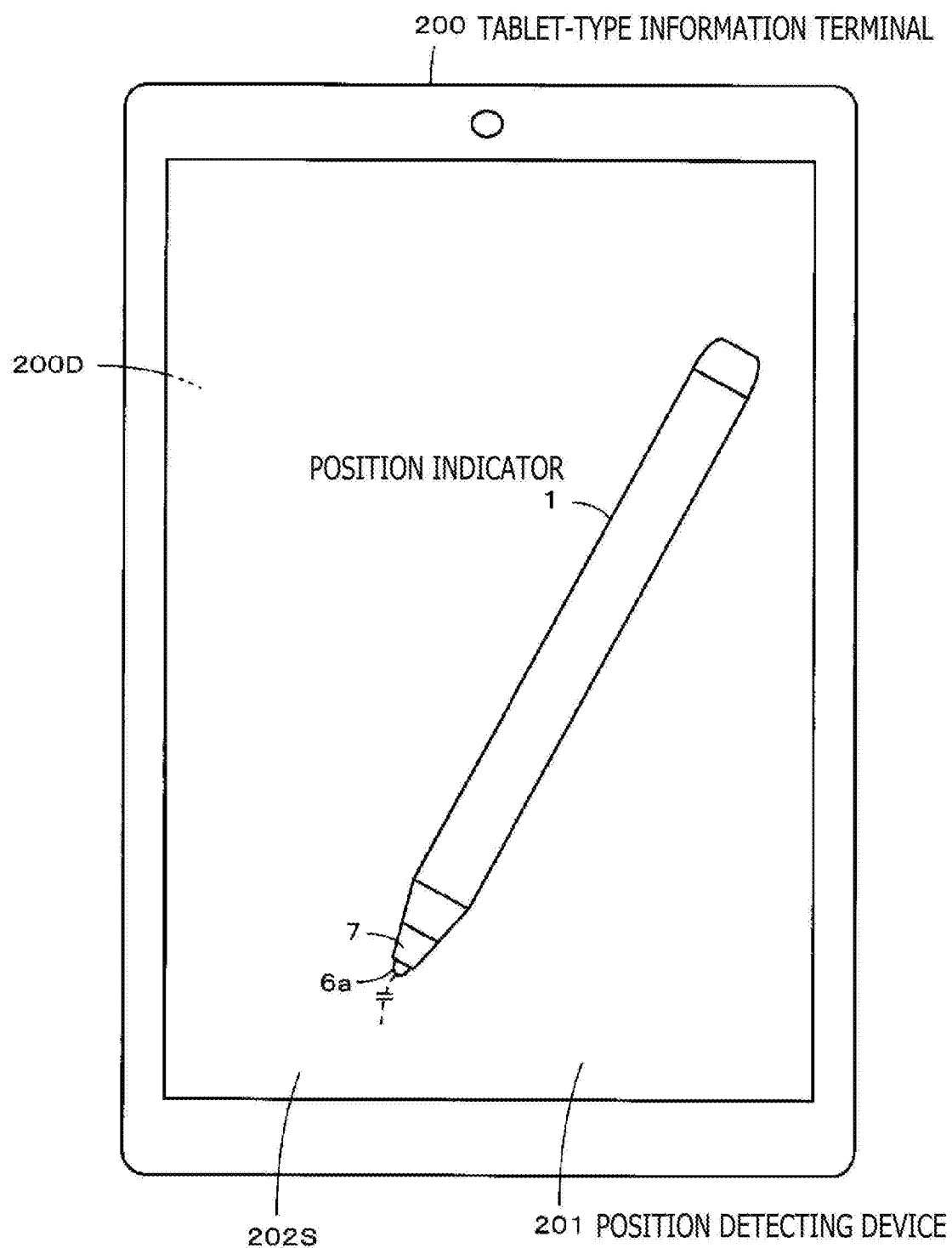
FIG. 1 is a diagram depicting one example of a tablet-type information terminal as an example of electronic equipment with which a position indicator according to a first embodiment of this disclosure is used.

FIG. 1 depicts one example of a tablet-type information terminal 200 as an example of electronic equipment with which a position indicator 1 of an embodiment of this disclosure is used. In this example, the tablet-type information terminal 200 includes a display screen 200D of a display device such as an LCD (Liquid Crystal Display), for example, and includes a sensor of a position detecting device 201 of a capacitive system over (on the front surface side) of the display screen 200D.

An operator indicates a position in an input surface 202S over the sensor of the position detecting device 201 of the tablet-type information terminal 200 by the position indicator 1. The position detecting device 201 detects the indicated position over the sensor of the position detecting device 201 by the position indicator 1.

[Explanation of Mechanical Configuration Example of Position Indicator 1 of Embodiment]

Figure 2:
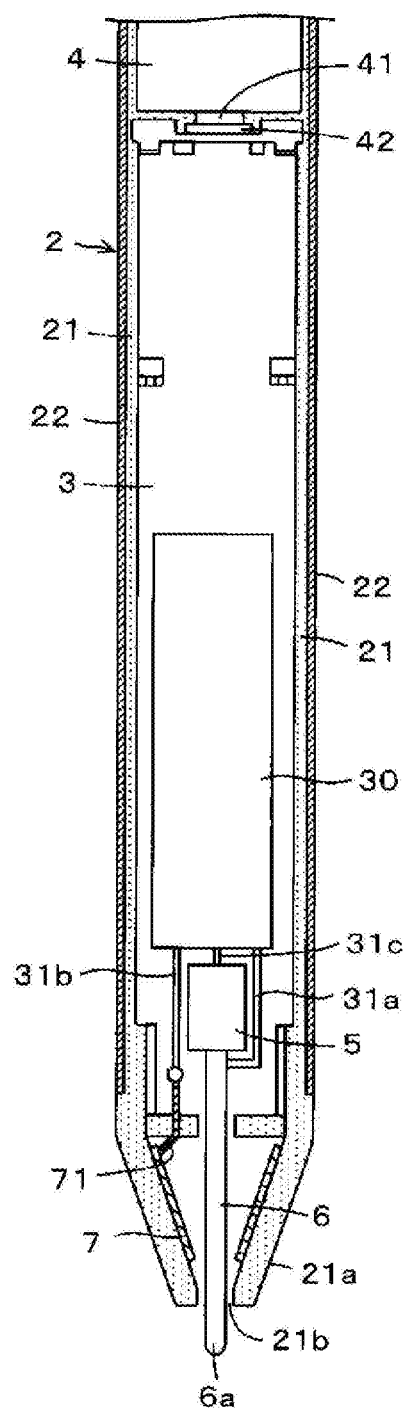
FIG. 2 is a diagram for explaining a configuration example of the position indicator according to the first embodiment of this disclosure.

FIG. 2 is a diagram for explaining a configuration example of the position indicator 1 of a first embodiment of this disclosure and is a partial longitudinal sectional view of the pen tip side mainly. In this embodiment, the position indicator 1 is formed as what has a pen shape in appearance.

[Explanation of Structural Configuration Example of Position Indicator of First Embodiment]

The position indicator 1 of this embodiment includes a housing 2 with a pen shape. This housing 2 is formed of an insulator part 21 that is composed of an insulating material, for example, a synthesis resin, and has a hollow cylindrical shape. Furthermore, in this embodiment, the part of the outer circumferential surface of the insulator part 21 of the housing 2 excluding the pen tip side is covered by an electrical conductor part 22 composed of a metal, for example. This electrical conductor part 22 is not an essential component and may be absent.

In the housing 2, a printed wiring board 3, a battery 4 as a power supply circuit, and a writing pressure detector 5 are disposed. The electrical conductor part 22 that covers the outer circumferential surface of the housing 2 is electrically connected to an earth conductor (e.g., common ground conductor) of this printed wiring board 3 although diagrammatic representation is omitted. The battery 4 may be a dry cell, a rechargeable storage battery, or a power supply circuit including a capacitor such as an electric double-layer capacitor to be described later.

Figure 4:
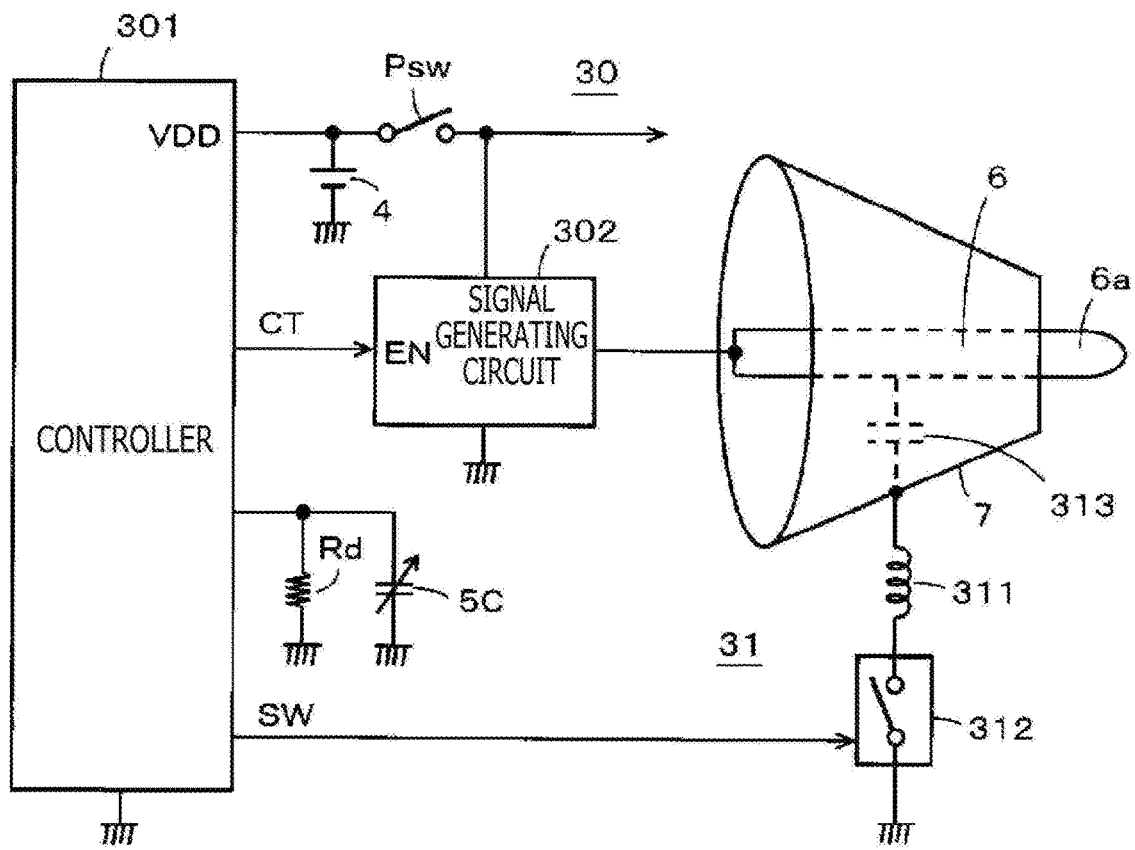
FIG. 4 is a block diagram depicting a configuration example of a transmission signal generating circuit including a signal transmission control circuit in of the position indicator according to the first embodiment this disclosure.

On the printed wiring board 3, a transmission signal generating circuit 30 and other electronic parts, wiring patterns, and so forth about which diagrammatic representation is omitted are disposed as depicted in FIG. 2. The transmission signal generating circuit 30 generates a signal for position detection and additional information and sends out the generated signal for position detection and additional information from the position indicator 1. In this embodiment, the transmission signal generating circuit 30 includes a signal transmission control circuit 31 that carries out switching control of the transmission range of the signal sent out from the position indicator 1 to cause change in the range of the region of reception from the position indicator 1 detected by a sensor 202 of the position detecting device 201 as depicted in FIG. 4 to be described later.

The battery 4 is a supply source of power to electronic circuits and electronic parts configured on the printed wiring board 3. A positive electrode 41 of the battery 4 is in contact with and electrically connected to a terminal 42 electrically connected to a power supply circuit part on the printed wiring board 3 and a negative electrode of the battery 4 is connected to the earth conductor of the printed wiring board 3 although diagrammatic representation is omitted. Although diagrammatic representation is omitted, the electrical conductor part 22 of the housing 2 is connected to the earth conductor of the printed wiring board 3 in this example.

In this embodiment, the writing pressure detector 5 has a configuration of a variable-capacitance capacitor that presents capacitance according to a writing pressure applied to a core body 6. Electrodes of both ends of the variable-capacitance capacitor formed of this writing pressure detector 5 are connected to the transmission signal generating circuit 30 by an electrically-conductive pattern 31c in FIG. 2.

The end part of the core body 6 on the opposite side to the pen tip side that protrudes to the outside of the housing 2 is fitted to the writing pressure detector 5 disposed in the hollow part of the housing 2. Thereby, the core body 6 is locked in the hollow part of the housing 2 of the position indicator 1.

The core body 6 is composed of a conductor, for example, a hard resin in which a metal or conductor powders are mixed, and forms a central conductor (first electrode) and is electrically connected to the transmission signal generating circuit 30 through an electrically-conductive pattern 31a. Furthermore, the configuration is made in such a manner that the signal for position detection and the additional information generated in the transmission signal generating circuit 30 are sent out to the sensor 202 of the position detecting device 201 through this core body 6 composed of the conductor.

One end part side of the insulator part 21, which forms the housing 2 and has the hollow cylindrical shape, in the center line direction is formed as a tubular tapered part 21a that gradually tapers as depicted in FIG. 2. To the inner wall surface of this tubular tapered part 21a, a ring electrode 7 that gradually tapers along the inner wall surface of the tapered part 21a and has a tubular conical shape is attached in such a state as to surround the core body 6 in such a manner that the core body 6 partly protrudes from the ring electrode 7 and forms a pen tip part.

This ring electrode 7 is an example of a peripheral conductor disposed to surround the core body 6 and is composed of an electrically-conductive metal, for example. That is, in this first embodiment, the peripheral conductor is formed of one ring electrode. In this case, the ring electrode 7 is covered by the tapered part 21a of the insulator part 21 of the housing 2 and thereby the operator of the position indicator 1 is precluded from directly getting contact with the ring electrode 7.

Furthermore, the ring electrode 7 is electrically connected to a conductor pattern 31b of the printed wiring board 3 by a lead conductor member 71 that penetrates the insulator part 21. In this example, this conductor pattern 31b is connected to the signal transmission control circuit 31 of the transmission signal generating circuit 30.

In this embodiment, the core body 6 is disposed in the hollow part of the insulator part 21 in such a manner that a tip part 6a protrudes to the outside from an opening part 21b of the tapered part 21a of the insulator part 21 of the housing 2 and the opposite side to the tip part 6a is fitted to the writing pressure detector 5.

Because the ring electrode 7 is disposed on the inner wall surface of the tapered part 21a of the insulator part 21 in the example of FIG. 2, the tip part 6a of the core body 6 is not surrounded also by the ring electrode 7 and protrudes to the outside.

That is, the ring electrode 7, which is disposed to surround the core body 6, is configured to surround the part excluding the tip part 6a and the side of coupling with the writing pressure detector 5 in the direction of the central axis of the core body 6 in this embodiment.

[Explanation of Configuration Example of Position Detecting Device 201]

Figure 3:
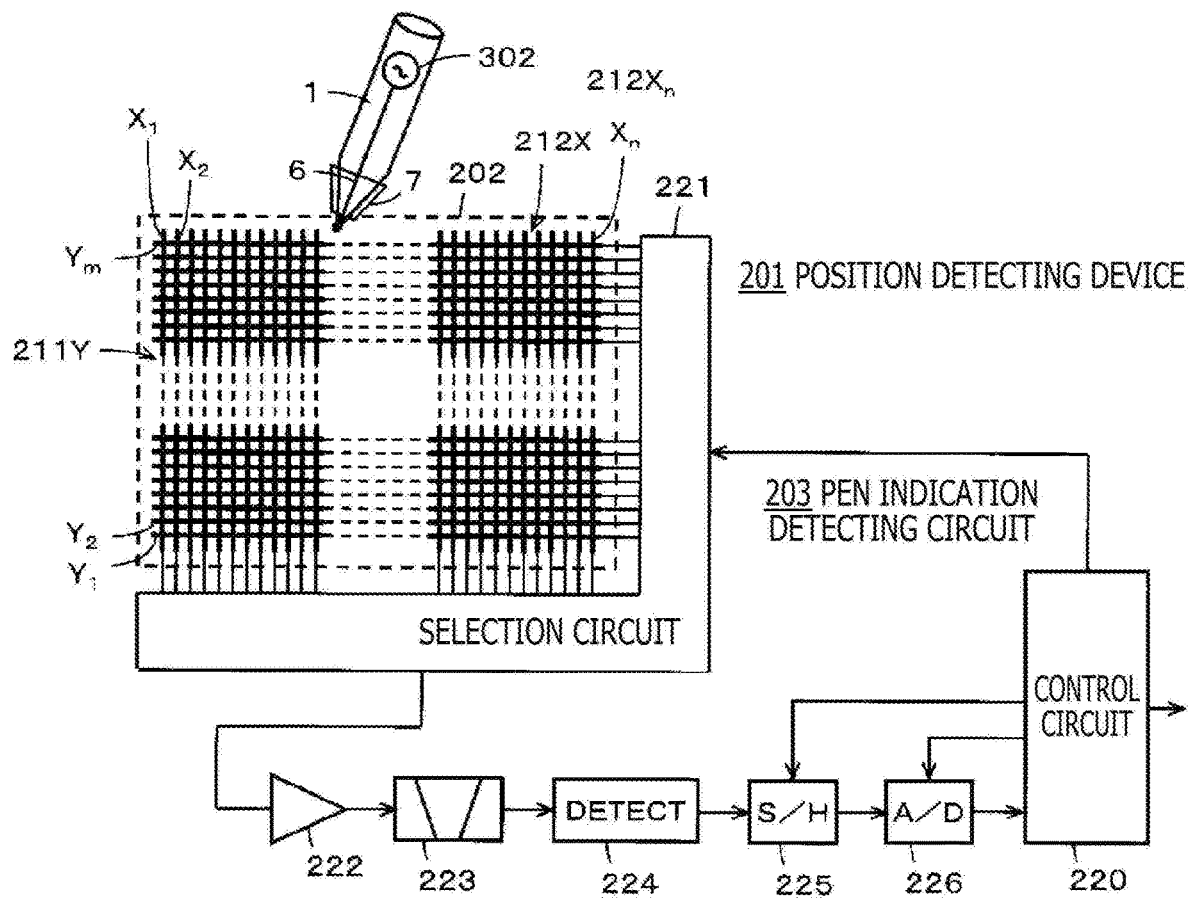
FIG. 3 is a diagram for explaining a configuration example of a position detecting device used with the position indicator according to this disclosure.

As depicted in FIG. 3, the position detecting device 201 used with the position indicator 1 in this embodiment is composed of the sensor 202 configuring this position detecting device 201 and a pen indication detecting circuit 203 connected to this sensor 202.

In this example, the sensor 202 is a component formed by stacking a first conductor group 211Y, an insulating layer (diagrammatic representation is omitted), and a second conductor group 212X sequentially from the lower layer side although a sectional view is omitted. For example, the first conductor group 211Y is what is obtained by disposing plural first conductors $Y_1, Y_2, \ldots, Y_m$ (m is an integer equal to or larger than 1) that extend along the horizontal direction (X-axis direction) in the Y-axis direction in parallel, with the plural first conductors $Y_1, Y_2, \ldots, Y_m$ separated from each other by predetermined intervals.

Furthermore, the second conductor group 212X is what is obtained by disposing plural second conductors $X_1$, $X_2, \ldots, X_n$ (n is an integer equal to or larger than 1) that extend along a direction intersecting the first conductors $Y_1$, $Y_2, \ldots, Y_m$, the vertical direction (Y-axis direction) orthogonal thereto in this example, in the X-axis direction in parallel, with the plural second conductors $X_1, X_2, \ldots, X_n$ separated from each other by predetermined intervals.

As above, the sensor 202 of the position detecting device 201 has a configuration to detect a position indicated by the position indicator 1 by using the sensor pattern formed by making the first conductor group 211Y intersect the second conductor group 212X.

In the following description, regarding the first conductors $Y_1, Y_2, \ldots, Y_m$, the conductor will be referred to as the first conductor Y when there is no need to discriminate the respective conductors. Similarly, regarding the second conductors $X_1, X_2, \ldots, X_n$, the conductor will be referred to as the second conductor X when there is no need to discriminate the respective conductors.

In the position detecting device 201 of this embodiment, the sensor 202 has a sensor surface (indication input surface) 201S with a size corresponding to the size of the display screen 200D of the tablet-type information terminal 200 as depicted in FIG. 1 and is formed by the first conductor group 211Y and the second conductor group 212X having optical transparency.

The pen indication detecting circuit 203 is composed of a selection circuit 221 disposed between the sensor 202 and the pen indication detecting circuit 203, an amplifying circuit 222, a band-pass filter 223, a detection circuit 224, a sample/hold circuit 225, an AD (Analog to Digital) conversion circuit 226, and a control circuit 220.

The selection circuit 221 selects each one of the conductors from the first conductor group 211Y and the second conductor group 212X based on a control signal from the control circuit 220. The conductors selected by the selection circuit 221 are connected to the amplifying circuit 222 and a signal from the position indicator 1 is detected by the selected conductors and is amplified by the amplifying circuit 222. The output of this amplifying circuit 222 is supplied to the band-pass filter 223 and only a component of the frequency of the signal transmitted from the position indicator 1 is extracted.

An output signal of the band-pass filter 223 is subjected to detection by the detection circuit 224. An output signal of this detection circuit 224 is supplied to the sample/hold circuit 225 and is sampled and held at predetermined timing based on a sampling signal from the control circuit 220. Thereafter, the signal is converted to a digital value by the AD conversion circuit 226. The digital data from the AD conversion circuit 226 is read by the control circuit 220 and is processed.

The control circuit 220 operates to send out a control signal to each of the sample/hold circuit 225, the AD conversion circuit 226, and the selection circuit 221. Furthermore, the control circuit 220 calculates position coordinates on the sensor 202 indicated by the tip part 6a of the core body 6 of the position indicator 1 from the digital data from the AD conversion circuit 226. Moreover, the control circuit 220 demodulates and obtains writing pressure information and detects the direction and magnitude (tilt angle) of the tilt of the direction of the central axis of the core body 6 of the position indicator 1 with respect to the input surface 202S of the sensor 202 (hereinafter, abbreviated as the tilt of the position indicator 1). Then, the control circuit 220 outputs the acquired coordinate data of the position indicated by the position indicator 1, the writing pressure information, and information on the direction and tilt angle of the tilt of the position indicator 1 to another processing processor or the like in electronic equipment such as a tablet-type information terminal, for example. A description will be made later about details of the method for calculation and detection of the coordinate data of the position indicated by the position indicator 1, the writing pressure information, and the information on the direction and tilt angle of the tilt of the position indicator in the position detecting device 201.

[Explanation of Configuration Example of Transmission Signal Generating Circuit 30 of Position Indicator 1 of First Embodiment]

As described above, the transmission signal generating circuit 30 of the position indicator 1 includes circuit that generates a signal to be transmitted to the sensor 202 of the position detecting device 201 through the core body 6 and the signal transmission control circuit 31.

FIG. 4 is a circuit configuration diagram of the transmission signal generating circuit 30 of the position indicator 1 of this embodiment. That is, in this example, the transmission signal generating circuit 30 includes a controller 301, a signal generating circuit 302 for generating a signal to be supplied to the core body 6, and the signal transmission control circuit 31.

A supply VDD from the battery 4 is used as a supply voltage for the transmission signal generating circuit 30 and other circuits through a power supply switch Psw. The power supply switch Psw is turned on and off through pressing-down operation of an operating element disposed on the side surface of the housing 2 although diagrammatic representation is omitted in FIG. 1 and FIG. 2.

The signal generating circuit 302 is formed of an oscillation circuit that generates an alternating-current signal. The signal generating circuit 302 generates an alternating-current signal with a frequency f0=1.8 MHz, for example, and the supply voltage VDD from the battery 4 is supplied thereto through the power supply switch Psw. A continuous wave of the alternating-current signal from this signal generating circuit 302 for a predetermined time, i.e. a burst signal, becomes a signal for position detection sent out to the sensor 202 through the core body 6.

The controller 301 is formed of a microprocessor, for example, and configures a control circuit that controls processing operations of the transmission signal generating circuit 30 of the position indicator 1. The supply voltage VDD from the battery 4 as an example of a drive power supply is supplied thereto. The controller 301 controls whether or not to send out a signal from the signal generating circuit 302.

That is, the controller 301 supplies a control signal (enable signal CT) to an enable terminal EN of the signal generating circuit 302 (oscillation circuit therein) to carry out on/off-control of this signal generating circuit 302 (oscillation circuit therein). Thereby, the signal generating circuit 302 generates the above-described burst signal and an ASK (Amplitude Shift Keying) modulation signal. The signal generating circuit 302 causes the generated alternating-current signal to be intermittent according to the enable signal CT from the controller 301 and thereby the signal generating circuit 302 generates the burst signal and the ASK modulation signal.

Furthermore, a variable-capacitance capacitor 5C formed of the writing pressure detector 5 is connected to the controller 301 and the controller 301 detects the writing pressure applied to the core body 6 of the position indicator 1 by monitoring the capacitance of this variable-capacitance capacitor 5C. Specifically, in this embodiment, a resistor Rd for discharge is connected to the variable-capacitance capacitor 5C. The controller 301 detects the capacitance of the variable-capacitance capacitor 5C by measuring the discharge time from the state in which the variable-capacitance capacitor 5C is fully charged until the voltage across the variable-capacitance capacitor 5C becomes a predetermined voltage, and detects the writing pressure from the detected capacitance.

In this embodiment, the controller 301 converts information on the value of the writing pressure detected in the above-described manner to a digital signal and controls the signal generating circuit 302 according to the digital signal. Thereby, the controller 301 causes the information on the writing pressure value to be output from the signal generating circuit 302 as the ASK modulation signal.

In this embodiment, an output end of the signal generating circuit 302 is connected to the electrically-conductive core body 6 and the alternating-current signal from the signal generating circuit 302 is sent out to the sensor 202 of the position detecting device 201 through the core body 6.

In the signal transmission control circuit 31, in this embodiment, the ring electrode 7 (second electrode) is connected to a part at which a reference potential of the printed wiring board 3 is obtained, the earth conductor in this example, through a series circuit of a coil 311 and a switch circuit 312 that is an example of an inductance circuit. On/off-control of the switch circuit 312 is carried out by a switching control signal SW from the controller 301.

In this case, the ring electrode 7 is disposed around the core body 6 as the first electrode and therefore the core body 6 and the ring electrode 7 are capacitively coupled by floating capacitance 313. Thus, an equivalent circuit of the transmission signal generating circuit 30 becomes what is depicted in FIG. 5.

Figure 5:
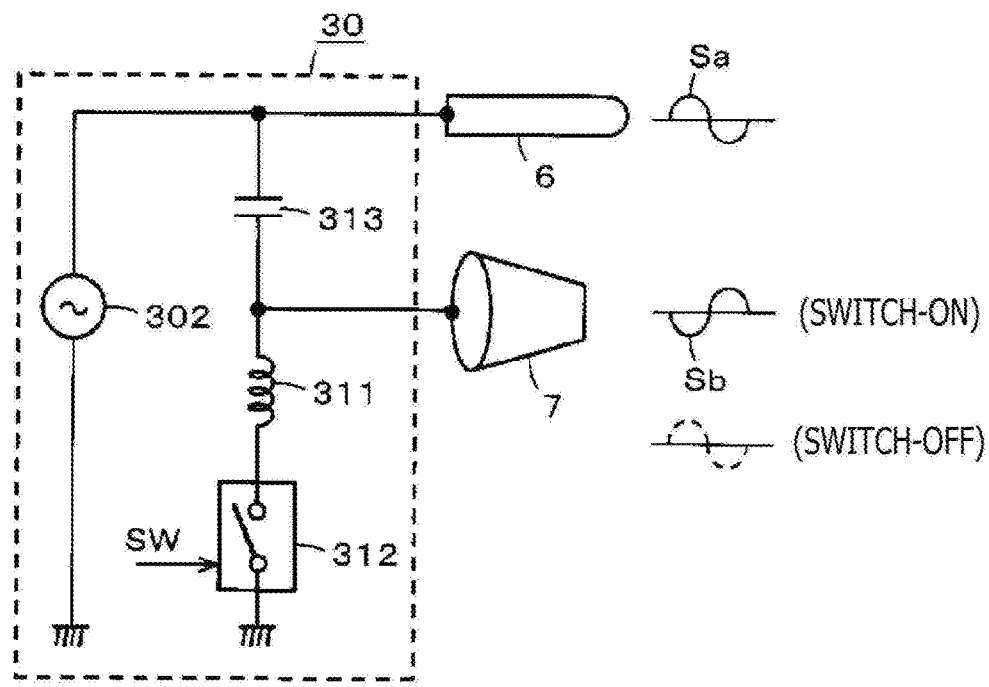
FIG. 5 is a diagram depicting an equivalent circuit of the transmission signal generating circuit in the example of FIG. 4.

As depicted in this equivalent circuit of FIG. 5, in the position indicator 1, the signal from the signal generating circuit 302 is sent out as an alternating-current signal Sa through the core body 6.

Furthermore, when the switch circuit 312 is turned on by the switching control signal SW from the controller 301, the ring electrode 7 becomes the state of being grounded through the coil 311. At this time, as depicted in the equivalent circuit of FIG. 5, due to the existence of the floating capacitance 313, a state is obtained in which the alternating-current signal Sa sent out from the core body 6 is transmitted from the ring electrode 7 as an alternating-current signal Sb of the opposite phase due to the coil 311. In other words, the ring electrode 7 functions to cancel out the signal sent out from the core body 6 in this example, and the situation of capacitive interaction between the tip part of the position indicator 1 in which the first electrode and the second electrode are disposed and the sensor 202 of the position detecting device 201 changes corresponding to on/off-operation of the switch circuit 312. For this reason, when the switch circuit 312 is in the on-state, a state is obtained in which the alternating-current signal from only the tip part 6a substantially is sent out to the sensor 202 of the position detecting device 201 from the core body 6 of the position indicator 1, and the transmission range of the alternating-current signal sent out from the core body 6 of the position indicator 1 becomes comparatively small.

On the other hand, when the switch circuit 312 is turned off by the switching control signal SW from the controller 301, the ring electrode 7 becomes a free end in terms of potential. Thus, from this ring electrode 7, the signal of the opposite phase to the signal sent out from the core body 6 is not sent out. Furthermore, a state is obtained in which a signal of the same phase as the signal sent out from the core body 6 leaks through the floating capacitance 313 and is sent out. Therefore, the transmission range of the alternating-current signal sent out from the core body 6 of the position indicator 1 when the switch circuit 312 is in the off-state becomes a wider range than when the switch circuit 312 is in the on-state.

When the power supply switch Psw is in the on-state, the position indicator 1 of this embodiment repeatedly sends out the signal for position detection and the detected writing pressure information in every signal transmission unit period Ps with a time length defined in advance. That is, in this embodiment, the position indicator 1 is configured to deem the time length of the signal transmission unit period Ps as one cycle and repeat this signal transmission unit period Ps when the power supply switch Psw is in the on-state.

Furthermore, in the position indicator 1 of this embodiment, as depicted in portion A of FIG. 6, the signal transmission unit period Ps is halved and the former half thereof is defined as a first period Pa and the latter half thereof is defined as a second period Pb. By the switching control signal SW from the controller 301, the switch circuit 312 is controlled to the on-state in the first period Pa and the switch circuit 312 is controlled to the off-state in the second period Pb.

Moreover, in synchronization with the switching control signal SW of the switch circuit 312, the controller 301 of the position indicator 1 generates the enable signal CT to carry out enable control of the signal generating circuit 302 and generates a signal to be sent out from the position indicator 1. Processing operation in the controller 301 at this time will be described with reference to the timing chart of FIG. 6.

Specifically, as depicted in portion A of FIG. 6, in the first period Pa of the signal transmission unit period Ps, the controller 301 sets the switch circuit 312 to the on-state to set the ring electrode 7 to the state of being grounded through the coil 311. Furthermore, in the second period Pb of the signal transmission unit period Ps, the controller 301 sets the switch circuit 312 to the off-state to set the ring electrode 7 to the floating state in terms of potential.

Moreover, in this state, as depicted in portion B of FIG. 6, from the beginning timing of the first period Pa and the second period Pb, the controller 301 controls the enable signal CT supplied to the signal generating circuit 302 in such a manner that the high level is kept for a certain period to output an alternating-current signal from the signal generating circuit 302 for the certain period continuously. This makes the core body 6 enter the state of radiating the alternating-current signal for the certain period continuously from the beginning timing of the first period Pa and the second period Pb (see continuous transmission period (a) and continuous transmission period (b) in portion C of FIG. 6).

In this continuous transmission period (a) and in the continuous transmission period (b), the controller 301 obtains the writing pressure applied to the tip part 6a of the core body 6. Specifically, the controller 301 detects the capacitance of the variable-capacitance capacitor 5C of the writing pressure detector 5 and detects the writing pressure from the detected capacitance in the above-described manner. Then, the controller 301 converts the detected writing pressure to digital data of plural bits, for example, and holds it.

When ending the continuous transmission period (a) or the continuous transmission period (b), the controller 10 turns the enable signal CT (see portion B of FIG. 6) to what corresponds to the obtained digital data of plural bits about the writing pressure and carries out ASK modulation by controlling the signal generating circuit 12 at a predetermined cycle Td (cycle Td corresponds to 1 bit) by this enable signal CT, to generate writing pressure data to be sent out.

At this time, the controller 301 sets the enable signal CT at the high level in the first round to send out a start signal for a predetermined time (see portion C of FIG. 6). This start signal is a signal for allowing the position detecting device side to accurately determine the subsequent data transmission timing and is used, in the position detecting device, in order to synchronize signal processing of ASK demodulation and so forth with the transmission timing of the signal from the position indicator 1. Even when the start signal is not set, the signal processing in the position detecting device can be synchronized by using the termination of the continuous transmission signal in the continuous transmission period (a) as the transmission timing of the ASK signal emitted from the position indicator 1.

The period of Td subsequent to this start signal is a transmission section of identification information of the above-described first period Pa or second period Pb. In this example, as depicted in portion C of FIG. 6, the controller 301 controls the enable signal CT in such a manner as to give sign "0" in the first period Pa and give "1" in the second period Pb as 1-bit identification information.

Subsequently to this identification information, the controller 301 sequentially transmits the writing pressure data of plural bits, 10 bits in the example of FIG. 6, obtained by the above-described operation. In this case, the controller 301 carries out ASK modulation by carrying out control in such a manner as to set the enable signal CT (see portion B of FIG. 6) to the low level to stop the generation of the alternating-current signal from the signal generating circuit 302 when the transmission data is "0" and set the enable signal CT to the high level to cause the alternating-current signal to be generated from the signal generating circuit 302 when the transmission data is "1" (see writing pressure data transmission period in FIG. 8C).

When ending the transmission of the writing pressure data, the controller 301 switches the switch circuit 312 by the switching control signal SW to carry out control to make switching from the first period Pa to the second period Pb or from the second period Pa to the first period Pa of the next signal transmission unit period Ps.

The controller 301 repeats the above-described operation, with the signal transmission unit period Ps being one cycle. In the position detecting device 201, in a manner described later, the alternating-current signal sent out from this position indicator 1 is received. Then, a position over the sensor 202 indicated by the tip part 6a of the core body 6 of the position indicator 1 is detected. In addition, the writing pressured that is being applied to the position indicator 1 and the tilt angle of the position indicator 1 are calculated.

[Detection of Signal from Core Body 6 of Position Indicator 1 in Position Detecting Device 201]

Next, detection of the signal from the core body 6 of the position indicator 1 in the position detecting device 201 will be described also in consideration of the relationship with the tilt angle of the position indicator.

FIGS. 7A, 7B, 7C, and 7D show the signal level of a received signal at the second conductors Xi−3, Xi−2, Xi−1, Xi, Xi+1, Xi+2, and Xi+3 near the second conductor Xi when the direction of the central axis of the core body 6 of the position indicator 1 is in the state of being perpendicular to the input surface 202S of the sensor 202 (tilt angle is zero degrees) and the tip part 6a of the core body 6 exists just above the second conductor Xi. Explanation can be similarly made also regarding the first conductors 211Y arranged in the Y-axis direction and therefore description thereof is omitted here.

Figure 7A:
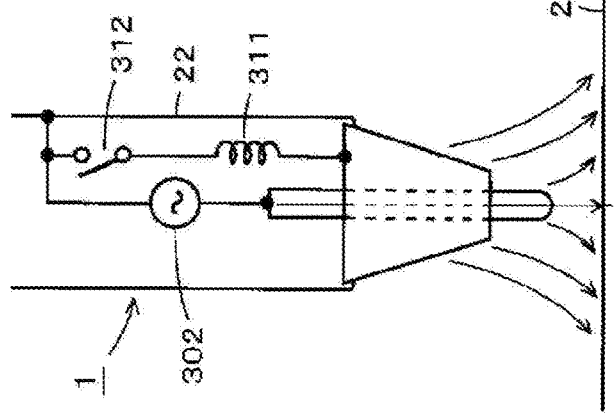
FIGS. 7A, 7B, 7C, and 7D are diagrams for explaining the relationship between the transmission status of the signal from the position indicator according to the first embodiment of this disclosure and the received-signal distribution in the sensor of the position detecting device.

In this case, when the switch circuit 312 is in the on-state as depicted in FIG. 7A in the transmission signal generating circuit 30 of the position indicator 1, from the tip part 6a of the core body 6, the output signal from the signal generating circuit 302 is transmitted to the input surface 202S of the sensor 202 of the position detecting device 201 with substantially unchanged intensity. However, at the part surrounded by the ring electrode 7 in the core body 6 and the part near the ring electrode 7 in the tip part 6a, the output signal is canceled out by the signal of the opposite phase from the ring electrode 7 and is not received by the sensor 202.

Figure 7C:
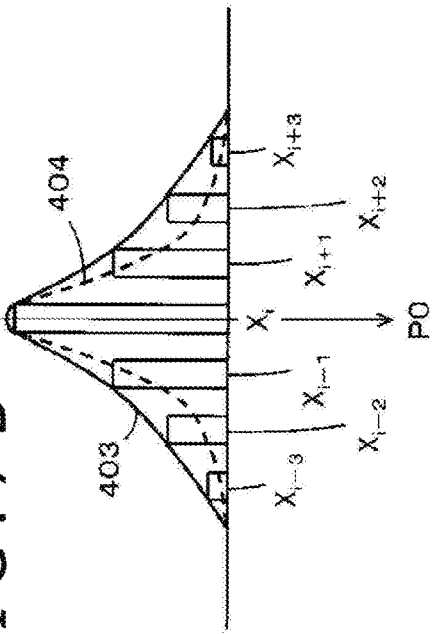
Figure 7B:
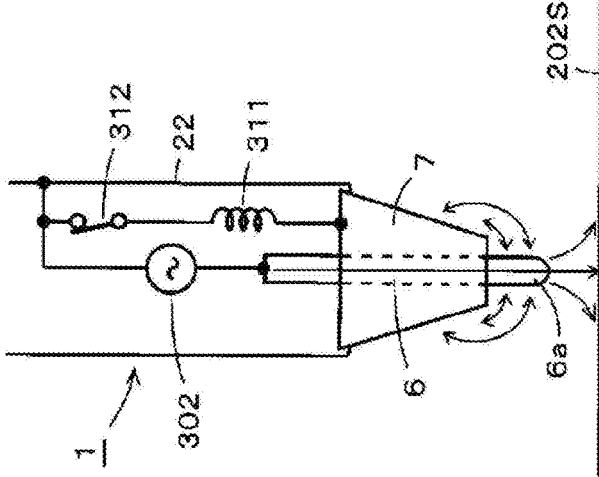

As a result, the received-signal distribution of the alternating-current signal sent out from the core body 6 of the position indicator 1 over the sensor 202 of the position detecting device 201 becomes a distribution of a smaller range (depicted by a solid line 402 in FIG. 7B) than distribution when the ring electrode 7 does not exist and only the core body 6 exists (depicted by a dashed line 401 in FIG. 7B). Furthermore, the signal level of the received signal of the signal from the core body 6 at plural conductors Xi−2, Xi−1, Xi, Xi+1, and Xi+2 of the sensor 202 of the position detecting device 201 becomes symmetric about the position indicated by the tip part 6a of the core body 6 (position of Xi in this example) as depicted by the solid line in FIG. 7B. Therefore, in the position detecting device 201, the position indicated by the tip part 6a of the core body 6 of the position indicator 1 is detected as a position P0 (=Xi).

Furthermore, when the switch circuit 312 is in the off-state in the transmission signal generating circuit 30 of the position indicator 1, the ring electrode 7 becomes the floating state in terms of potential. Therefore, the signal of the opposite phase is not generated and the configuration becomes almost equivalent to that when the ring electrode 7 does not exist and only the core body 6 exists as depicted in FIG. 7C. Therefore, at this time, the received-signal distribution of the alternating-current signal sent out from the core body 6 of the position indicator 1 over the sensor 202 of the position detecting device 201 becomes distribution when the ring electrode 7 does not exist and only the core body 6 exists (depicted by a solid line 403 in FIG. 7D) and becomes wider than the distribution when the switch circuit 312 is in the on-state (depicted by a dashed line 404 in FIG. 7D).

Figure 7D:
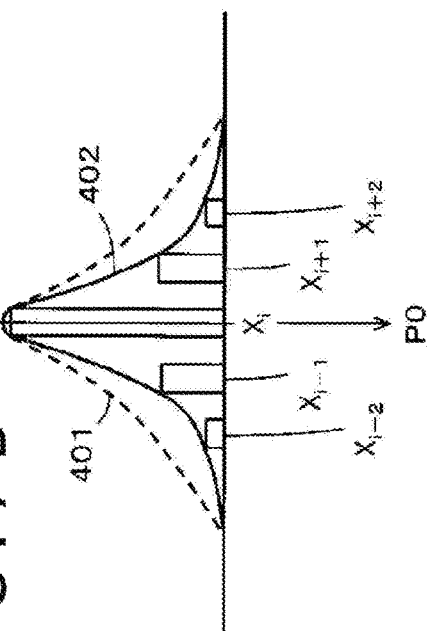

Moreover, in the sensor 202 of the position detecting device 201, as depicted by the solid line 403 in FIG. 7D, the received signal of the signal from the core body 6 is obtained at plural conductors Xi−3, Xi−2, Xi−1, Xi, Xi+1, Xi+2, and Xi+3 in a wider range than when the switch circuit 312 is in the on-state. In addition, the signal level at each of the plural conductors Xi−3, Xi−2, Xi−1, Xi, Xi+1, Xi+2, and Xi+3 becomes symmetric about the position indicated by the tip part 6a of the core body 6 (position of Xi in this example) as depicted by the solid line in FIG. 7D. Therefore, in the position detecting device 201, the position indicated by the tip part 6a of the core body 6 of the position indicator 1 when the switch circuit 312 is in the off-state is detected as the position P0 (=Xi) as with the case in which the switch circuit 312 is in the on-state.

That is, when the direction of the central axis of the core body 6 of the position indicator 1 is perpendicular to the input surface 202S of the sensor 202 and the tilt angle is zero degrees, in the position detecting device 201, the position indicated by the tip part 6a of the core body 6 of the position indicator 1 is detected as the same position in both periods of the first period Pa and the second period Pb.

Next, with reference to FIGS. 8A, 8B, 8C, and 8D, description will be made about the case in which the position indicator 1 is inclined by a predetermined angle θ (θ<90 degrees) (case in which the direction of the central axis of the core body 6 is inclined by the predetermined angle θ (θ<90 degrees) with respect to the input surface 202S of the sensor 202).

Figure 8A:
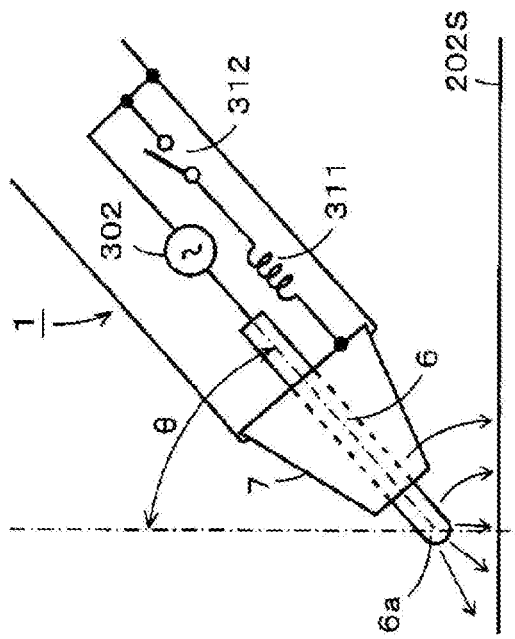
FIGS. 8A, 8B, 8C, and 8D are diagrams for explaining the relationship between the transmission status of the signal from the position indicator according to the first embodiment of this disclosure and the received-signal distribution in the sensor of the position detecting device.

FIG. 8A shows a state in which the position indicator 1 is inclined at the predetermined angle θ (θ<90 degrees) and the switch circuit 312 is in the on-state. In this case, the signal from the core body 6 is transmitted to the sensor 202 in such a manner that not only a signal component from the tip part 6a thereof but also a signal component from the part close to the sensor becomes effective according to the tilt of the position indicator 1. Therefore, a signal transmission distribution state like one depicted by a dotted line 406 in FIG. 8B is obtained. However, when the switch circuit 312 is in the on-state, an alternating-current signal of the opposite phase to the alternating-current signal sent out from the core body 6 is sent out from the ring electrode 7. Therefore, the signal component from the part other than the tip part 6a of the core body 6 is canceled out by this opposite-phase signal from the ring electrode 7. For this reason, even when the position indicator 1 is inclined as depicted in FIG. 8A, a state is obtained in which, from the core body 6, the signal is sent out to the sensor 202 from only the tip part 6a substantially.

As a result, even when the position indicator 1 is inclined as depicted in FIG. 8A, for example, the received-signal distribution of the alternating-current signal sent out from the core body 6 over the sensor 202 of the position detecting device 201 becomes substantially symmetric about the position indicated by the tip part 6a of the core body 6 as depicted by a solid line 405 in FIG. 8B. Furthermore, the signal level of the received signal of the signal from the core body 6 at plural conductors Xi−2, Xi−1, Xi, Xi+1, and Xi+2 of the sensor 202 of the position detecting device 201 becomes symmetric about the position indicated by the tip part 6a of the core body 6 as depicted by the solid line in FIG. 8B.

Therefore, in the position detecting device 201, the position indicated by the tip part 6a of the core body 6 can be correctly detected even when the position indicator 1 is inclined. That is, in the example of FIG. 8B, in the position detecting device 201, the position indicated by the tip part 6a of the core body 6 located above the second conductor Xi of the sensor 202 is correctly detected as the position P0.

In this case, in the position indicator 1 of this embodiment, the inductance value of the coil 311 connected to the ring electrode 7 is adjusted to such a value that the position indicated by the tip part 6a of the core body 6 can be correctly detected in the position detecting device 201 even when the position indicator 1 is inclined.

In other words, by adjusting the inductance value of the coil 311, the intensity of the signal that is sent out from the ring electrode 7 and has the opposite phase to the signal sent out from the core body 6 can be adjusted. For this reason, the ring electrode 7 does not need to be disposed to be extended to the vicinity of the tip part 6a of the core body 6 and the disposing position of the ring electrode 7 can be arbitrarily selected. Therefore, restrictions on the position indicator in terms of appearance design are reduced. In order to adjust the intensity of the signal that is sent out from the ring electrode 7 and has the opposite phase to the signal sent out from the core body 6, how far the tip part 6a of the core body 6 is protruded relative to the ring electrode 7 may also be adjusted, of course.

Figure 8C:
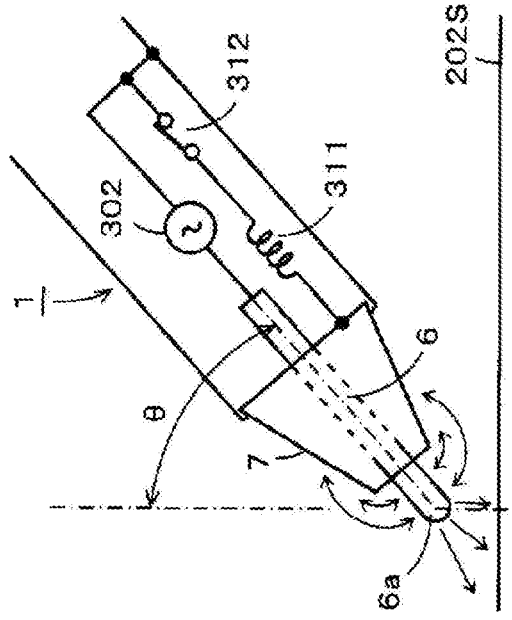
Figure 8B:
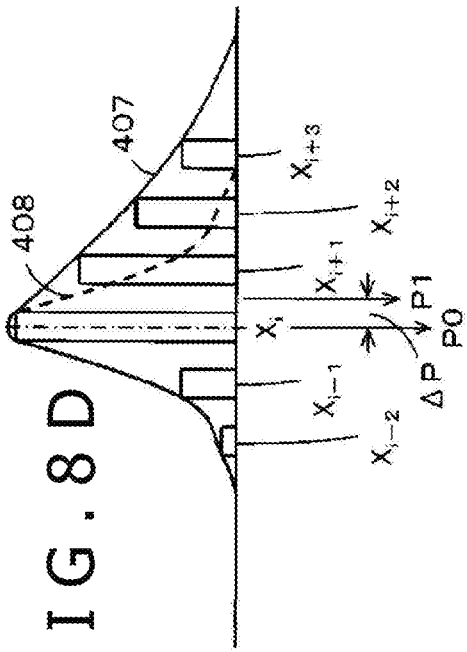

Next, as depicted in FIG. 8C, in the position indicator 1, the ring electrode 7 becomes a free end in terms of potential when the switch circuit 312 is turned off by the switching control signal SW from the controller 301. Therefore, the signal of the opposite phase to the signal sent out from the core body 6 is not sent out from this ring electrode 7. As depicted in FIG. 8C, not only the signal from the tip part 6a of the core body 6 of the position indicator 1 but the signal sent out from the whole of the core body 6 that comes closer to the input surface 202S of the sensor 202 becomes effective according to the tilt of the position indicator 1. At this time, a state is obtained in which, from the ring electrode 7, a signal of the same phase as the signal sent out from the core body 6 leaks through the floating capacitance 313 and is slightly sent out.

Figure 8D:
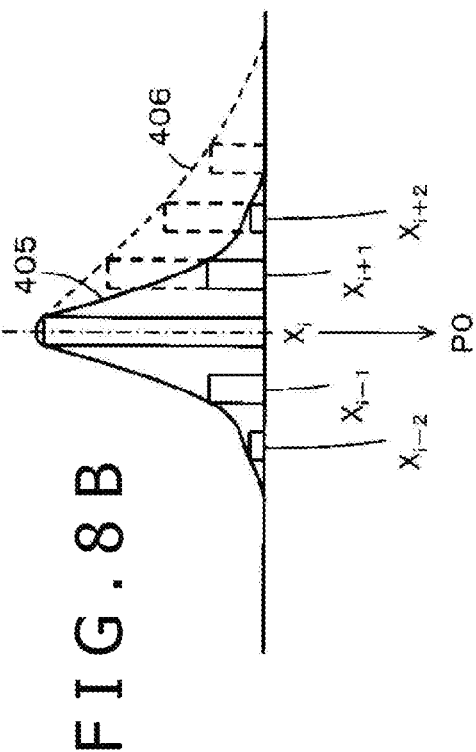

As a result, the received-signal distribution of the alternating-current signal sent out from the core body 6 of the position indicator 1 over the sensor 202 of the position detecting device 201 is distributed with intensity according to the separation distance of the core body 6 from the input surface 202S of the sensor 202 as depicted by a solid line 407 in FIG. 8D (equal to the dotted line 406 in FIG. 8B). Specifically, a state is obtained in which, in the sensor 202 of the position detecting device 201, the signal from the position indicator 1 is received in a region wider toward the side to which the position indicator 1 is inclined than when the switch circuit 312 is in the on-state in the position indicator 1 (depicted by a dotted line 408 in FIG. 8D).

Therefore, when the position indicator 1 is inclined as depicted in FIG. 8C, the received signal of the signal from the core body 6 is received at plural conductors Xi−2, Xi−1, Xi, Xi+1, Xi+2, and Xi+3 of the sensor 202 of the position detecting device 201 and the signal level thereof becomes that depicted by the solid line 407 in FIG. 8D.

As a result, in the sensor 202 of the position detecting device 201, a state is obtained in which the signal is received by the conductors in a wider range in the region toward which the position indicator 1 is inclined. Thus, when the position indicated by the core body 6 of the position indicator 1 is calculated, it becomes possible to surely calculate the indicated position according to the tilt of the direction of the central axis of the core body 6. In the example of FIG. 8D, in the position detecting device 201, the position indicated by the core body 6 is detected as a position P1 that deviates by ΔP with respect to the position P0 indicated by the tip part 6a of the core body 6.

In the control circuit 220 of the position detecting device 201, based on the signal from the position indicator 1 received in the above-described manner, the position indicated by the core body 6 of the position indicator 1 in the first period Pa, in which the switch circuit 312 is in the on-state, and the position indicated by the core body 6 of the position indicator 1 in the second period Pb, in which the switch circuit 312 is in the off-state, are detected in each signal transmission unit period Ps. In this case, in the control circuit 220 of the position detecting device 201, whether the received signal is the received signal in the first period Pa or the received signal in the second period Pb is detected by detecting identification information from the position indicator 1.

Furthermore, in the control circuit 220 of the position detecting device 201, the detection output of the position indicated by the core body 6 of the position indicator 1 and the tilt angle of the position indicator 1 are detected from the position indicated by the core body 6 of the position indicator 1 in the first period Pa, in which the switch circuit 312 is in the on-state, and the position indicated by the core body 6 of the position indicator 1 in the second period Pb, in which the switch circuit 312 is in the off-state.

Specifically, in the control circuit 220 of the position detecting device 201, when the position indicated by the core body 6 of the position indicator 1 in the first period Pa and the position indicated by the core body 6 of the position indicator 1 in the second period Pb, in which the switch circuit 312 is in the off-state, are both the position P0 as depicted in FIGS. 7B and 7C, it is determined that the detection output of the position indicated by the core body 6 of the position indicator 1 is the position P0. In addition, it is detected that the position indicator 1 is not inclined and the tilt angle is zero degrees (perpendicular).

Figure 9:
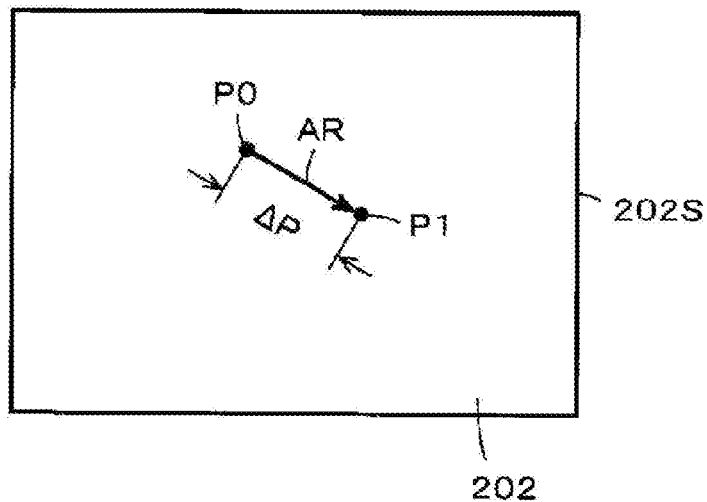
FIG. 9 is a diagram for explaining a method for detecting the direction and magnitude of the tilt of the position indicator by the position detecting device based on the received signal from the position indicator according to the first embodiment of this disclosure.

Furthermore, in the control circuit 220 of the position detecting device 201, when the position indicated by the core body 6 of the position indicator 1 in the first period Pa is the position P0 as depicted in FIG. 8B and the position indicated by the core body 6 of the position indicator 1 in the second period Pb, in which the switch circuit 312 is in the off-state, is the position P1 as depicted in FIG. 8D and the positions of these positions P0 and P1 over the input surface 202S of the sensor 202 are ones depicted in FIG. 9, it is determined that the detection output of the position indicated by the core body 6 of the position indicator 1 is the position P0. In addition, the direction of an arrow AR from the position P0 toward the position P1 is detected as the tilt direction of the position indicator 1 and the tilt direction and the magnitude of the tilt angle regarding the position indicator 1 are detected from distance ΔP from the position P to the position P1.

It goes without saying that the direction of the arrow AR from the position P0 toward the position P1 and the distance ΔP from the position P0 to the position P1 can be calculated by using the X-coordinate value and Y-coordinate value of the position P0 and the position P1. Furthermore, the corresponding tilt angle of the position indicator 1 may be obtained from the distance ΔP by arithmetic operation, for example. However, a conversion table between the distance ΔP and the tilt angle can be prepared in advance and the tilt angle can be obtained from the conversion table.

As above, according to the position indicator 1 of the first embodiment, in the signal transmission control circuit 31, in the signal transmission unit period Ps, the on/off-state of the switch circuit 312 is switched to use the first period Pa as the period for position indication detection and use the second period Pb as the period for tilt detection. This allows the position detecting device 201 to detect the position indicated by the core body 6 of the position indicator 1 and the direction of the tilt and the magnitude of the tilt regarding the core body 6. Furthermore, in this case, the switch circuit 312 is not disposed on the signal path of the signal to be sent out and switches whether or not connect the inductance circuit that sends out the signal of the opposite phase through the floating capacitance 313 between the ring electrode 7 and the supply end of the reference voltage. This provides effects that the circuit configuration is simplified and the power consumption of the position indicator 1 becomes lower.

Moreover, in the position indicator 1 of this first embodiment, the signal transmission control circuit 31 is composed of the coil 311 as the inductance circuit and the switch circuit 312 and is configured to send out the signal of the opposite phase to the signal from the core body 6 from the ring electrode 7. Therefore, the position indicated by the core body 6 of the position indicator 1 detected in the first period Pa as the period for position detection can be correctly detected irrespective of the tilt of the position indicator 1. For this reason, when this position indicator 1 of the first embodiment is used, there is also an effect that the position indicated by the core body 6 of the position indicator 1 does not need to be corrected based on the detected tilt angle of the position indicator 1 in the position detecting device 201.

It is explained that the floating capacitance 313 is virtually connected between the core body 6 and the ring electrode 7 in the equivalent circuit of FIG. 5. However, a capacitor may be actually connected between the core body 6 and the ring electrode 7 and the capacitance of the capacitor may be adjusted to such a value that the position indicated by the tip part 6a of the core body 6 can be correctly detected by the position detecting device 201. In this case, the capacitance of the capacitor that actually connects a capacitor between the core body 6 and the ring electrode 7 may be adjusted instead of adjusting the inductance value of the coil 303 or with adjustment of the inductance value of the coil 303.

In the explanation of the above-described first embodiment, the ring electrode 7 is connected to the earth conductor through the coil 311. However, the ring electrode 7 may be connected to a terminal at which the supply voltage VDD is obtained. That is, it suffices for the ring electrode 7 to be connected to a reference potential through the coil 311.

In the position indicator 1 of the above-described first embodiment, the writing pressure data is sent out in both periods of the first period Pa and the second period Pb. However, the writing pressure data may be kept from being sent out in the second period Pb, which is the period for tilt detection.

Second Embodiment

Figure 10:
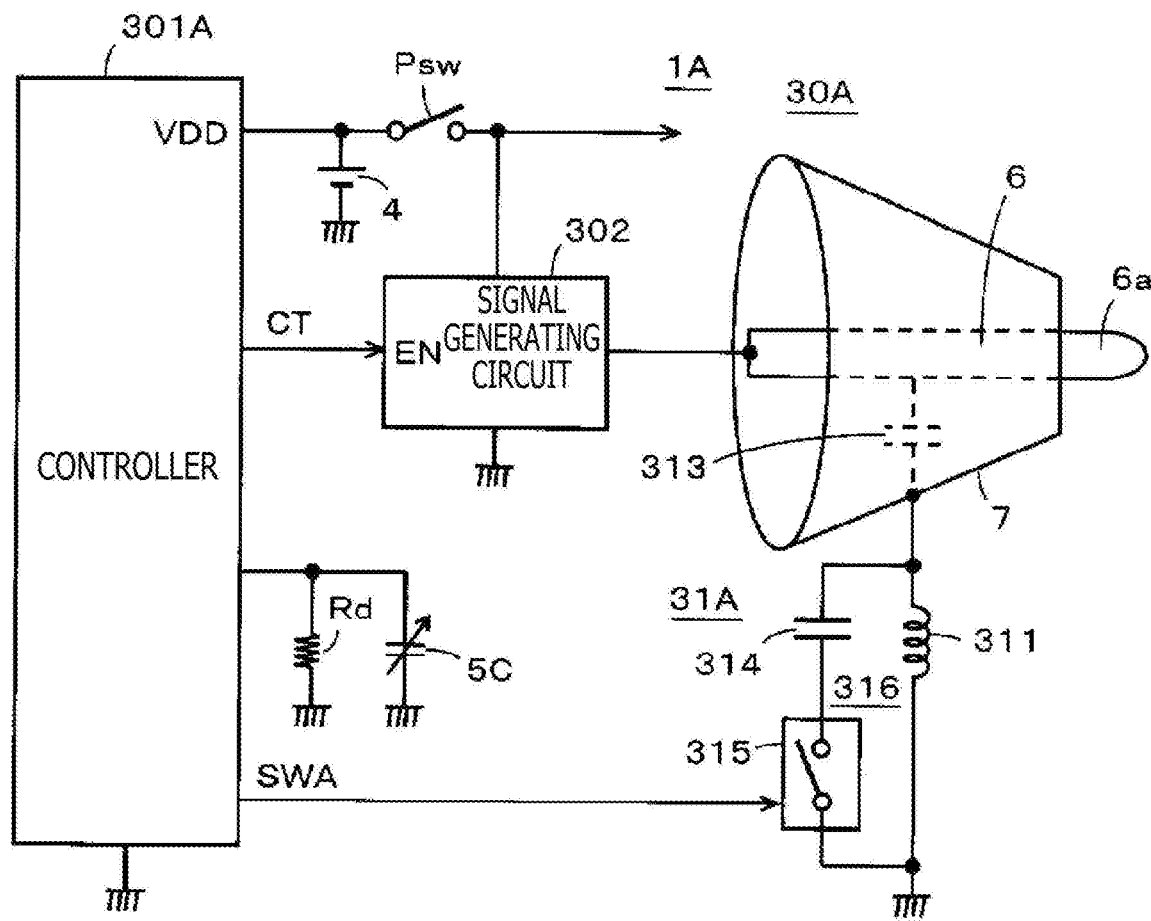
FIG. 10 is a block diagram depicting a configuration example of a transmission signal generating circuit including a signal transmission control circuit in of a position indicator according to a second embodiment this disclosure.

FIG. 10 is a diagram depicting a configuration example of a transmission signal generating circuit 30A of a position indicator 1A of a second embodiment. Except for the configuration of this transmission signal generating circuit 30A, the hardware configuration of the position indicator 1A of the second embodiment is made as the same configuration as the first embodiment depicted in FIG. 2.

Furthermore, in the transmission signal generating circuit 30A of the position indicator 1A of this second embodiment, a signal transmission control circuit 31A different from the signal transmission control circuit 31 in the transmission signal generating circuit 30 of the position indicator 1 of the first embodiment is connected between the ring electrode 7 and a ground terminal as an example of a reference potential. The other constituent elements of the position indicator 1A of this second embodiment are the same as the position indicator 1 of the first embodiment. In FIG. 10, the same constituent element part as the position indicator 1 of the first embodiment is given the same reference numeral and detailed description thereof is omitted.

In the transmission signal generating circuit 30A of the position indicator 1A of this second embodiment, as depicted in FIG. 10, the coil 311 as an example of an inductance circuit is connected between the ring electrode 7 and the ground terminal. In addition, a series circuit of a capacitance circuit 314 and a switch circuit 315 is connected in parallel to this coil 311. Furthermore, a controller 301A generates a switching control signal SWA to carry out switching control of the on/off-state of the switch circuit 315 and supplies the switching control signal SWA to the switch circuit 315.

Figure 11:
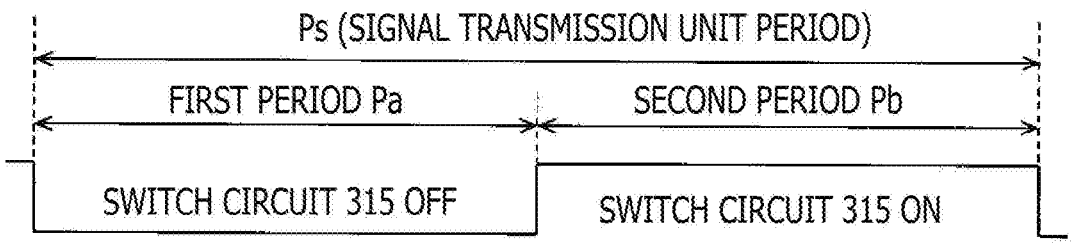
FIG. 11 is a diagram for explaining switching of a switch circuit of the signal transmission control circuit in the example of FIG. 10.

In this case, in the position indicator 1A of this second embodiment, as depicted in FIG. 11, the controller 301A carries out switching control, by the switching control signal SWA, to set the switch circuit 315 to the off-state in the first period Pa and set the switch circuit 315 to the on-state in the second period Pb. In the position indicator 1A of this second embodiment, the other configuration is made similarly to the transmission signal generating circuit 30 of the first embodiment.

Figure 12:
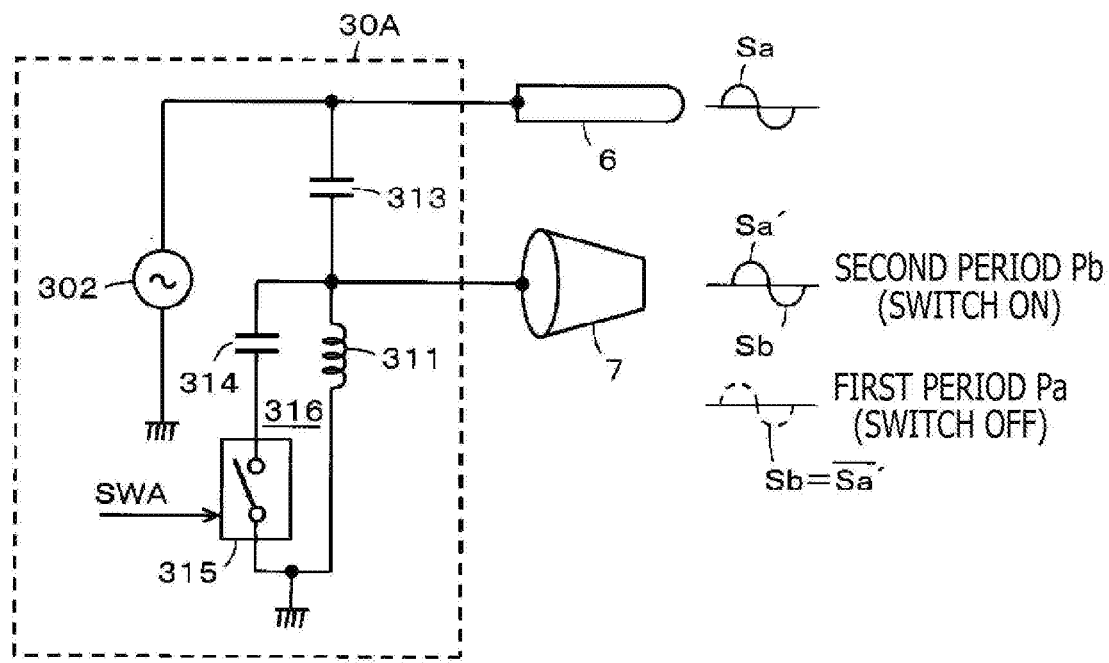
FIG. 12 is a diagram depicting an equivalent circuit of the transmission signal generating circuit in the example of FIG. 10.

An equivalent circuit of the transmission signal generating circuit 30A of the position indicator 1A of this second embodiment becomes what is depicted in FIG. 12.

In the first period Pa of the position indicator 1A of the second embodiment configured as above, the switch circuit 315 is set to the off-state. Therefore, the ring electrode 7 is connected to the reference potential through the coil 311 as with the first period Pa in the first embodiment. Therefore, in the first period Pa, as depicted in FIG. 12, also in the position indicator 1A of this second embodiment, a signal Sb of the opposite phase to a signal Sa sent out from the core body 6 is sent out from the ring electrode 7 and the same operation as the position indicator 1 of the first embodiment is carried out. Consequently, even when the position indicator 1A is inclined, the position indicated by a tip part 62 of the core body 6 of the position indicator 1A can be correctly detected irrespective of the inclination in the position detecting device 201.

On the other hand, in the second period Pb of the position indicator 1A of this second embodiment, the switch circuit 315 is set to the on-state. Therefore, the capacitance circuit 314 is connected in parallel to the coil 311 and a resonant circuit 316 composed of the coil 311 and capacitance circuit 314 is connected between the ring electrode 7 and the ground terminal. In this case, in this second embodiment, the resonant frequency of this resonant circuit 316 is selected to be equal to the oscillation frequency of the oscillation circuit included in the signal generating circuit 302.

Therefore, in the second period Pb, in which the switch circuit 315 is set to the on-state, the resonant circuit 316 is connected between the ring electrode 7 and the ground terminal. Therefore, as depicted in FIG. 12, a state is obtained in which a signal Sa' of the same phase as the signal Sa sent out from the core body 6 is sent out from the ring electrode 7. For this reason, the received-signal distribution of the alternating-current signal sent out from the core body 6 of the position indicator 1A over the sensor 202 of the position detecting device 201 presents a distribution in a wider range than that when the switch circuit 315 is in the off-state. Specifically, for example, when the direction of the central axis of the core body 6 of the position indicator 1A is perpendicular to the input surface 202S of the sensor 202 as in FIG. 7C, received-signal distribution in a wider range than that of the solid line 403 depicted in FIG. 7A is presented. Furthermore, for example, when the position indicator 1A is inclined as in FIG. 8C, received-signal distribution in a range wider toward the inclination side than that of the solid line 407 depicted in FIG. 8D is presented.

Therefore, according to the position indicator 1A of this second embodiment, in the sensor 202, it becomes possible to receive the signal from the position indicator 1A by conductors in the wider range in the second period Pb and therefore calculation of the tilt angle of the position indicator 1A becomes easy.

In the position indicator 1A of the above-described second embodiment, the resonant frequency of the resonant circuit 316 is selected to be equal to the oscillation frequency of the oscillation circuit of the signal generating circuit 302. However, the resonant frequency of the resonant circuit 316 does not necessarily need to be selected to be the same as the oscillation frequency of the oscillation circuit of the signal generating circuit 302 and may be different. However, when the resonant frequency of the resonant circuit 316 is selected to be equal to the oscillation frequency of the oscillation circuit of the signal generating circuit 302, in the second period Pb, distribution in a wider range is presented as the received-signal distribution of the alternating-current signal sent out from the core body 6 of the position indicator 1A over the sensor 202 of the position detecting device 201.

Third Embodiment

A third embodiment to be described below is an example in which detection of not only the tilt angle of the position indicator but also the rotation angle of the position indicator is enabled.

Figure 13:
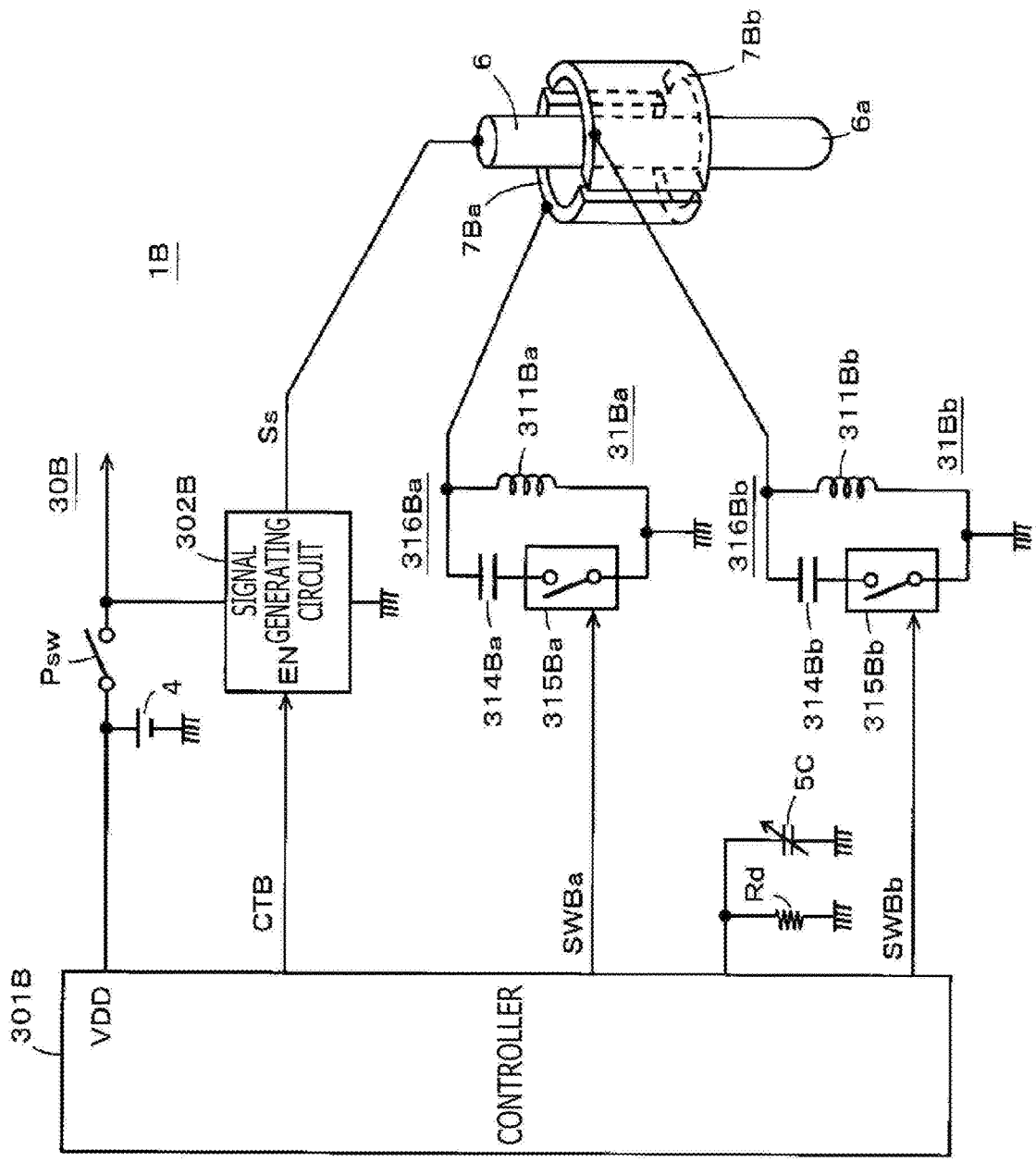
FIG. 13 is a block diagram depicting a configuration example of a transmission signal generating circuit including signal transmission control circuits in a position indicator according to a third embodiment of this disclosure.

FIG. 13 is a diagram depicting a configuration example of a transmission signal generating circuit 30B of a position indicator 1B of this third embodiment. As the hardware configuration, the position indicator 1B of this third embodiment is different from the position indicator 1 of the above-described first embodiment in the configuration of the peripheral conductor.

Specifically, in the position indicator 1B of this third embodiment, as depicted in FIG. 13, the peripheral conductor is composed of plural, in this example, two peripheral electrodes 7Ba and 7Bb disposed to surround the core body 6. The two peripheral electrodes 7Ba and 7Bb are what are obtained by halving a cylindrical conductor by a plane including the center line thereof and are each disposed to surround the core body 6 in an angle range slightly smaller than 180 degrees. In this case, the two peripheral electrodes 7Ba and 7Bb are disposed separately with the intermediary of gaps in the circumferential direction so as to be electrically insulated from each other.

Furthermore, between the two peripheral electrodes 7Ba and 7Bb and a reference potential, a ground terminal in this example, a signal transmission control circuit 31Ba and a signal transmission control circuit 31Bb, respectively, are connected.

In this example, the signal transmission control circuit 31Ba and the signal transmission control circuit 31Bb are configured similarly to the signal transmission control circuit 31A of the position indicator 1A of the above-described second embodiment.

Specifically, in the signal transmission control circuit 31Ba, a coil 311Ba as an example of an inductance circuit is connected between the peripheral electrode 7Ba and the ground terminal. In addition, a series circuit of a capacitance circuit 314Ba and a switch circuit 315Ba is connected in parallel to this coil 311Ba. Furthermore, a controller 301B generates a switching control signal SWBa to carry out switching control of the on/off-state of the switch circuit 315Ba and supplies the switching control signal SWBa to the switch circuit 315Ba.

Moreover, when the switch circuit 315Ba is set to the on-state, the peripheral electrode 7Ba is grounded through a parallel resonant circuit 316Ba composed of the coil 311Ba and the capacitance circuit 314Ba. Furthermore, when the switch circuit 315Ba is set to the off-state, the peripheral electrode 7Ba becomes the state of being grounded through the coil 311Ba. In this case, also in this example, the resonant frequency of the parallel resonant circuit 316Ba is selected to be equal to the oscillation frequency of the oscillation circuit of the signal generating circuit 302.

Furthermore, in the signal transmission control circuit 31Bb, a coil 311Bb as an example of an inductance circuit is connected between the peripheral electrode 7Bb and the ground terminal. In addition, a series circuit of a capacitance circuit 314Bb and a switch circuit 315Bb is connected in parallel to this coil 311Bb. Furthermore, the controller 301B generates a switching control signal SWBb to carry out switching control of the on/off-state of the switch circuit 315Bb and supplies the switching control signal SWBb to the switch circuit 315Bb.

Moreover, when the switch circuit 315Bb is set to the on-state, the peripheral electrode 7Bb is grounded through a parallel resonant circuit 316Bb composed of the coil 311Bb and the capacitance circuit 314Bb. Furthermore, when the switch circuit 315Bb is set to the off-state, the peripheral electrode 7Bb becomes the state of being grounded through the coil 311Bb. In this case, also in this example, the resonant frequency of the parallel resonant circuit 316Bb is selected to be equal to the oscillation frequency of the oscillation circuit of the signal generating circuit 302.

The other configuration of the position indicator 1B of this third embodiment is formed similarly to the position indicator 1 of the above-described first embodiment or the position indicator 1A of the second embodiment. So, in FIG. 13, the same part as the position indicator 1 or 1A of the above-described embodiment is given the same reference numeral and detailed description thereof is omitted.

In FIG. 14, a timing chart for explaining transmission signal control in the position indicator 1B of this third embodiment is depicted. Specifically, in the position indicator 1B of this third embodiment, a signal transmission unit period Ps is configured to be composed of a period Pa for position detection composed of a continuous transmission period, a start signal period, an identification information period, and a writing pressure data transmission period as depicted in portion D of FIG. 14 and a period Pc for tilt-and-rotation detection.

The period Pc for tilt-and-rotation detection is composed of periods Pc1 and Pc2 for rotation detection and a period Pc3 for tilt detection. In this example, each of the periods Pc1 and Pc2 for rotation detection and the period Pc3 for tilt detection also has the continuous transmission period, the start signal period, the identification information period, and the writing pressure data transmission period. In each of the periods Pc1 and Pc2 for rotation detection and the period Pc3 for tilt detection, the writing pressure data transmission period may be absent.

Furthermore, in the identification information period in each of the period Pa for position detection and the three periods of the period Pc for tilt-and-rotation detection, i.e. the periods Pc1 and Pc2 for rotation detection and the period Pc3 for tilt detection, identification information to identify each period is sent out as depicted in portion C of FIG. 14. In this case, because the four periods are identified, 2-bit symbols are employed as the identification information. In this example, the identification information of the period Pa for position detection is set as "00." The identification information of the period Pc1 for rotation detection is set as "01." The identification information of the period Pc2 for rotation detection is set as "10." The identification information of the period Pc3 for tilt detection is set as "11." Portion C of FIG. 14 is an output signal Ss of a signal generating circuit 302B and the controller 301B supplies an enable signal CTB to the signal generating circuit 302B to send out this output signal Ss.

Moreover, at timing that synchronizes with the enable signal CTB, the controller 301B generates the switching control signal SWBa (see portion A of FIG. 14) to control the switch circuit 315Ba of the signal transmission control circuit 31Ba and the switching control signal SWBb (see portion B of FIG. 14) to control the switch circuit 315Bb of the signal transmission control circuit 31Bb and supplies them to the switch circuit 315Ba and the switch circuit 315Bb.

Specifically, as depicted in portions A and B of FIG. 14, in the first period Pa (period for position detection), the switch circuit 315Ba and the switch circuit 315Bb are both set to the off-state and the peripheral electrodes 7Ba and 7Bb become the state of being grounded through the coil 311Ba and the coil 311Bb, respectively. Therefore, as described above, the position indicator 1B becomes the state in which the signal of the opposite phase to the signal sent out from the core body 6 is sent out from the peripheral electrodes 7Ba and 7Bb in the first period Pa.

Accordingly, in the position detecting device 201 that has received the signal transmission in this first period Pa from the position indicator 1B, the position indicated by the tip part 6a of the core body 6 of the position indicator 1B is correctly detected even when the position indicator 1B is inclined in the above-described manner. At this time, the position detecting device 201 detects the identification information "00" included in the signal from the position indicator 1B and the position indicator 1B recognizes that the present period is the first period Pa, and acquires the detected coordinate position as the position indicated by the tip part 6a of the core body 6 of the position indicator 1B.

Next, in the first period Pc1 for rotation detection in the period Pc for tilt-and-rotation detection, the switch circuit 315Ba of the position indicator 1B is set to the on-state and the switch circuit 315Bb is set to the off-state as depicted in portions A and B of FIG. 14. This makes the state in which the peripheral electrode 7Ba is grounded through the resonant circuit 316Ba and the peripheral electrode 7Bb is grounded through the coil 311Bb. Thus, in the position detecting device 201, the position indicated by the core body 6 of the position indicator 1B is shifted in the direction of the peripheral electrode 7Ba and is detected as a coordinate position according to the direction and magnitude of the inclination of the position indicator 1B.

Next, when the period Pc2 for rotation detection starts, the switch circuit 315Ba of the position indicator 1B is turned off and the switch circuit 315Bb is turned on as depicted in portions A and B of FIG. 14. This makes the state in which the peripheral electrode 7Ba is grounded through the coil 311Ba and the peripheral electrode 7Bb is grounded through the resonant circuit 316Bb. Thus, in the position detecting device 201, the position indicated by the core body 6 of the position indicator 1B is shifted in the direction of the peripheral electrode 7Bb and is detected as a coordinate position according to the direction and magnitude of the inclination of the position indicator 1B.

Figure 15A:
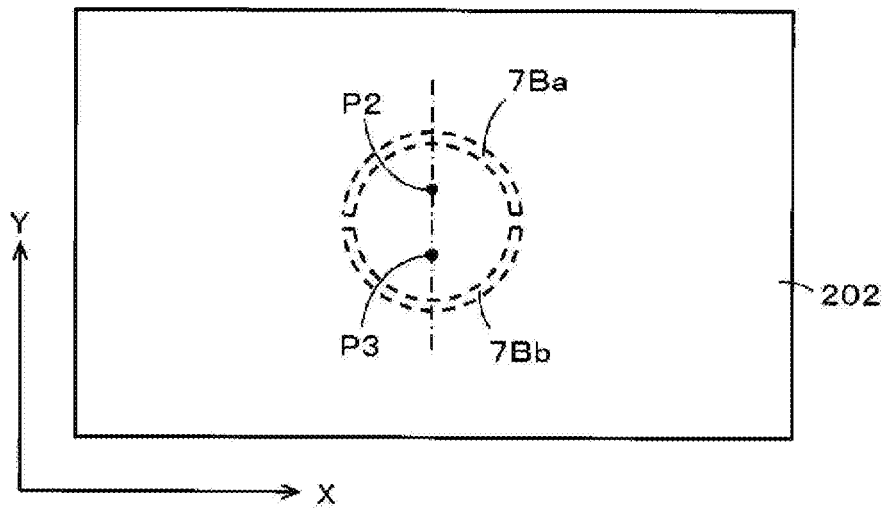
FIGS. 15A and 15B are diagrams for explaining a method for detecting the rotation angle of the position indicator in the position indicator according to the third embodiment of this disclosure.
Figure 15B:
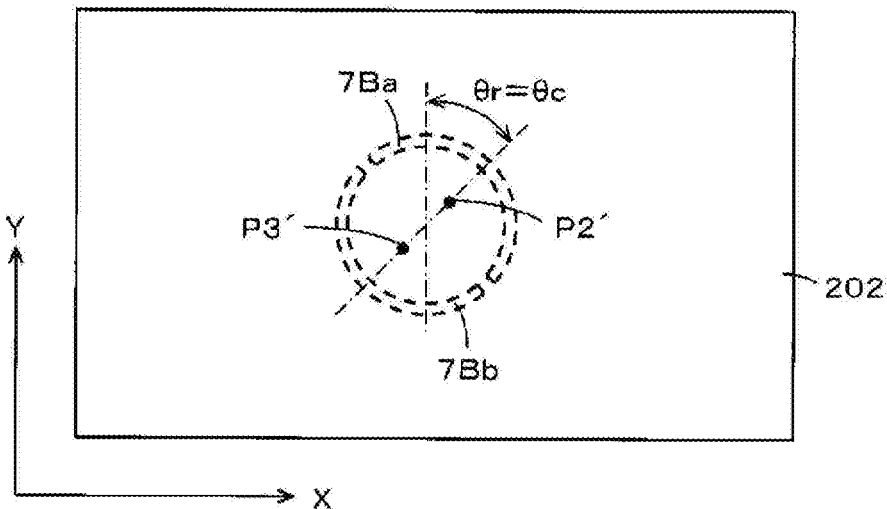

In the position detecting device 201, the rotation angle of the position indicator 1B is calculated from the coordinate positions of the positions indicated by the position indicator 1B obtained in these two periods Pc1 and Pc2 for rotation detection. The calculation of this rotation angle will be described with reference to FIGS. 15A and 15B. FIGS. 15A and 15B is a diagram for explaining the positional relationship between the coordinate positions of the positions indicated by the position indicator 1B over the sensor 202 of the position detecting device 201 and the rotation direction of the peripheral electrodes 7Ba and 7Bb of the position indicator 1B. In FIGS. 15A and 15B, for simplification of explanation, the position indicator 1B is set to the state of being perpendicular to the input surface of the sensor 202 and being not tilted.

In this example, for example, as depicted in FIG. 15A, the state in which the center position of the peripheral electrode 7Ba of the position indicator 1B in the circumferential direction and the center position of the peripheral electrode 7Ba in the circumferential direction are parallel to the Y-coordinate axis of the sensor 202 is defined as a reference position of the rotation angle of the position indicator 1B (rotation angle θr=zero degrees). The rotation angle of the position indicator 1B is detected as deviation from this rotation direction position of the basis. Furthermore, the rotation angle of the position indicator 1B is calculated as the angle formed by the line segment that couples the coordinate position detected as the position indicated by the position indicator 1B in the period Pc1 for rotation detection and the coordinate position detected as the position indicated by the position indicator 1B in the period Pc2 for rotation detection and the rotation direction reference position, the Y coordinate axis in this example.

When the rotation direction position of the peripheral electrodes 7Ba and 7Bb of the position indicator 1B is the same position as in FIG. 15A, the position indicated by the position indicator 1B in the period Pc1 for rotation detection is detected as a coordinate position P2 in FIG. 15A, for example. Furthermore, the position indicated by the position indicator 1B in the period Pc2 for rotation detection is detected as a coordinate position P3 in FIG. 15A, for example. In the state of FIG. 15A, the angle formed by the line segment that couples the coordinate position P2 and the coordinate position P3 and the Y coordinate axis is zero degrees and the rotation angle of the position indicator 1B is calculated as zero degrees.

Moreover, when the rotation direction position of the peripheral electrodes 7Ba and 7Bb of the position indicator 1B rotates to a position depicted in FIG. 15B, the position indicated by the position indicator 1B in the period Pc1 for rotation detection is detected as a coordinate position P2' in FIG. 15B. Furthermore, the position indicated by the position indicator 1B in the period Pc2 for rotation detection is detected as a coordinate position P3' in FIG. 15B. Therefore, the rotation angle θr of the position indicator 1B is calculated as an angle θc formed by the line segment that couples the coordinate position P2 and the coordinate position P3 and the Y coordinate axis (θr=θc) as depicted in FIG. 15B.

The example of FIGS. 15A and 15B is the example in which the direction of the central axis of the core body 6 of the position indicator 1B is in the state of being perpendicular to the input surface 202S of the sensor 202 and the position indicator 1B is not inclined as described above. Thus, the coordinate positions P2 and P2' and the coordinate positions P3 and P3' are positions like those depicted in the diagrams. However, in practice, they become coordinate positions according to the direction and magnitude of the inclination of the position indicator 1B as described above. However, the rotation angle of the position indicator 1B can be calculated substantially similarly to the above description.

Next, in the position indicator 1B of this embodiment, when the last period of the period Pc for tilt-and-rotation detection, i.e., the period Pc3 for tilt detection, starts, the switch circuit 315Ba of the position indicator 1B is turned on and the switch circuit 315Bb is also set to the on-state as depicted in portions A and B of FIG. 14. Due to this, the peripheral electrode 7Ba becomes the state of being grounded through the resonant circuit 316Bb and the peripheral electrode 7Bb also becomes the state of being grounded through the resonant circuit 316Bb.

That is, in the period Pc3 for tilt detection, the peripheral electrodes 7Ba and 7Bb surrounding the core body 6 become the state of being grounded through the resonant circuits 316Ba and 316Bb, respectively. This state is the same state as in the second period Pb in the second embodiment, in which the ring electrode 7A disposed to surround the core body 6 is grounded through the resonant circuit 316, although the peripheral conductor is divided into the peripheral electrodes 7Ba and 7Bb. Therefore, in the position detecting device 201, the coordinate position according to the inclination of the position indicator 1B is detected as the position indicated by the core body 6 of the position indicator 1B as described above.

Furthermore, in the position detecting device 201, the direction of the tilt and the magnitude of the tilt regarding the position indicator 1B are calculated in the manner described above in the second embodiment from the detected coordinates of the position indicated by the tip part 6a of the core body 6 of the position indicator 1B detected in the first period Pa, which is the period for position detection, and the detected coordinates of the position indicated by the core body 6 of the position indicator 1B detected in the relevant period Pc3 for tilt detection.

The relationship between the state of the switch circuit 315Ba and the switch circuit 315Bb in each of the periods Pa, Pc1, Pc2, and Pc3 explained above and the coordinate position that can be obtained in the position detecting device 201 is marshaled and depicted in a table of FIG. 16.

In the above-described manner, in the position indicator 1B of the third embodiment, the position indicated by the tip part 6a of the core body 6 of the position indicator 1B can be substantially correctly detected even when the position indicator 1B is inclined in the first period Pa, which is the period for position detection. In addition, the direction and magnitude of the tilt of the position indicator 1B can be detected from the coordinate position of the position indicated by the tip part 6a of the core body 6 of the position indicator 1B detected in the period Pc3 for tilt detection and the coordinate position of the position indicated by the tip part 6a of the core body 6 of the position indicator 1B detected in the first period Pa. Moreover, in the position indicator 1B of the third embodiment, the rotation angle of the position indicator 1B can be detected from the coordinate positions of the positions indicated by the tip part 6a of the core body 6 of the position indicator 1B detected in the periods Pc1 and Pc2 for rotation detection.

Modification Examples of Third Embodiment

In the position indicator 1B of the above-described third embodiment, as the signal transmission control circuits 31Ba and 31Bb, the configuration in which each of the peripheral electrodes 7Ba and 7Bb is grounded through the resonant circuit when the switch circuit is in the on-state is used as with the signal transmission control circuit 31A of the position indicator 1A of the second embodiment. However, it is also possible to employ a configuration of a series circuit of a coil as an example of the inductance circuit and a switch circuit as with the signal transmission control circuit 31 in the position indicator 1 of the first embodiment.

Furthermore, the number of peripheral electrodes of the core body 6 is set to two in the position indicator 1B of the above-described third embodiment. However, the number of peripheral electrodes may be two or more. For example, in a position indicator 1C of an example of FIG. 17, a configuration is made in such a manner that three peripheral electrodes 7Ca, 7Cb, and 7Cc in an angle range slightly smaller than 120 degrees in this example are disposed to surround the core body 6 and signal transmission control circuits 31Ca, 31Cb, and 31Cc are connected between these three peripheral electrodes 7Ca, 7Cb, and 7Cc and a reference potential, a ground terminal in this example. A signal from the signal generating circuit 302 is supplied to the core body 6 as with the above-described embodiments.

The configuration of the signal transmission control circuits 31Ca, 31Cb, and 31Cc included in a transmission signal generating circuit 30C may be the same as the signal transmission control circuit 31 of the first embodiment or may be the same as the signal transmission control circuit 31A of the second embodiment.

Figure 17:
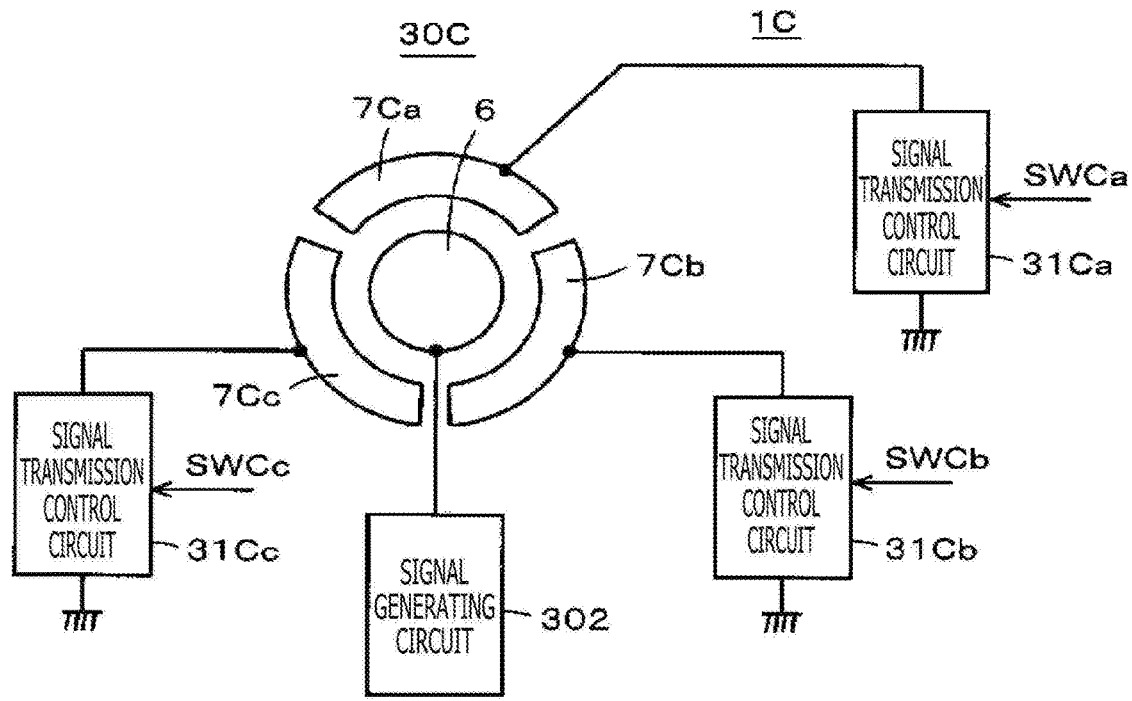
FIG. 17 is a block diagram depicting another configuration example of the transmission signal generating circuit including the signal transmission control circuits in the position indicator according to the third embodiment of this disclosure.

In the case of this example of FIG. 17, a configuration is made as follows. The position indicator 1C divides the second period Pc that is the period for tilt-and-rotation detection into three periods and, in each period, controls switching control signals SWCa, SWCb, and SWCc supplied to the signal transmission control circuits 31Ca, 31Cb, and 31Cc. Thereby, the position indicated by the core body 6 of the position indicator 1C that is shifted in the direction of each of the three peripheral electrodes 7Ca, 7Cb, and 7Cc and is according to the direction and magnitude of the inclination of the position indicator 1C is caused to be detected in the position detecting device 201. In each of the three periods obtained by dividing the second period Pc, which is the period for tilt-and-rotation detection, identification information of the period is made to be included in the signal sent out from the core body 6 as with the above-described embodiments.

In the position detecting device 201, in the first period Pa, the position indicated by the tip part 6a of the core body 6 of the position indicator 1C can be substantially correctly detected even when the position indicator 1C is tilted. Furthermore, in the position detecting device 201, in the three periods of the second period Pc, the coordinate positions of the positions indicated by the core body 6 of the position indicator 1C that are shifted in the direction of each of the three peripheral electrodes 7Ca, 7Cb, and 7Cc and are according to the direction and magnitude of the inclination of the position indicator 1C are detected.

In this case, these detected three coordinate positions are what correspond to the direction and magnitude of the inclination of the position indicator 1C. So, in the position detecting device 201, the rotation angle of the position indicator 1C and the direction and magnitude of the inclination of the position indicator 1C are detected by using these detected three coordinate positions. In the case of this example, the period Pc3 for tilt detection in the case of the above-described position indicator 1B does not need to be set particularly. However, the same period as the period Pc3 for tilt detection may be set, of course.

As with the second embodiment, the resonant frequency of each of resonant circuits 316Ca, 316Cb, and 316Cc does not necessarily need to be selected to be the same as the oscillation frequency of the oscillation circuit of the signal generating circuit 302 and may be different.

Other Embodiments and Modification Examples

In the position indicators of the above-described embodiments, the signal transmission control circuit includes the coil as an example of the inductance circuit and the configuration is made in such a manner that the position indicated by the tip part of the core body of the position indicator can be correctly detected even when the position indicator is tilted by connecting the peripheral electrode to the reference potential through the coil in the first period Pa, which is the period for position detection, through on/off-control of the switch circuit.

However, if the use purpose of the signal transmission control circuit is limited to the use purpose of detecting the tilt of the position indicator, basically it suffices to set the transmission region range distribution of the signal from the position indicator wider than that in the period for position detection. When this fact is considered, the signal transmission control circuit is not limited to what includes the coil as an example of the above-described inductance circuit.

Figure 18:
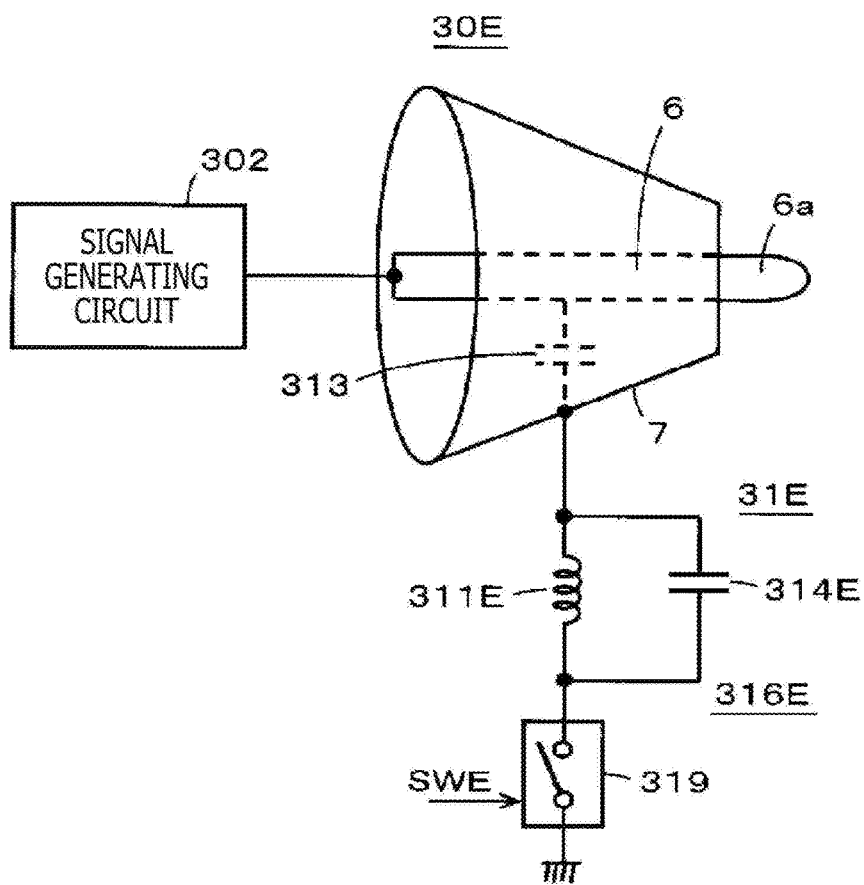
FIG. 18 is a diagram for explaining another modification example of the transmission signal generating circuit of the position indicator according to this disclosure.

FIG. 18 shows another configuration example of the signal transmission control circuit and is the case of the signal transmission control circuit of the position indicator of the first embodiment.

In a signal transmission control circuit 31E included in a transmission signal generating circuit 30E of the example of FIG. 18, the ring electrode 7 as an example of the peripheral electrode is connected to a ground terminal as an example of the reference potential through a series circuit of a parallel resonant circuit 316E composed of a coil 311E and a capacitance circuit 314E and a switch circuit 319. The resonant frequency of the resonant circuit 316E is selected to be equal to the oscillation frequency of the oscillation circuit of the signal generating circuit 302. Also as described above, the resonant frequency of the resonant circuit 316E may be different from the oscillation frequency of the oscillation circuit of the signal generating circuit 302.

Also in this example of FIG. 18, by a switching control signal SWE from the controller 301 (diagrammatic representation is omitted in FIG. 18), the switch circuit 319 is set to the off-state in the first period Pa as the period for position detection and is set to the on-state in the second period Pb as the period for tilt detection.

In the case of this example of FIG. 18, in the first period Pa, a signal is sent out from only the core body 6 substantially because the switch circuit 319 is in the off-state. On the other hand, in the second period Pb, the ring electrode 7 is grounded through the resonant circuit 316E because the switch circuit 319 is in the on-state. Thus, a signal is sent out from the core body 6 and a signal of the same phase as the signal sent out from the core body 6 is sent out from the ring electrode 7. So, the transmission region range of the signal sent out from the position indicator becomes a wider range than the signal in the first period Pa. Therefore, it becomes easy to detect the tilt of the position indicator in the second period Pb.

The identification information for detecting the first period and the second period in the signal transmission unit period in the above-described embodiments and furthermore the periods Pc1 and Pc2 for rotation detection and the tilt detection period Pc3 in the second period in the case of the third embodiment is transmitted from the transmission signal generating circuits 30 of the position indicators 1, 1A, and 1B to the position detecting device 201 through the sensor 202.

Figure 19:
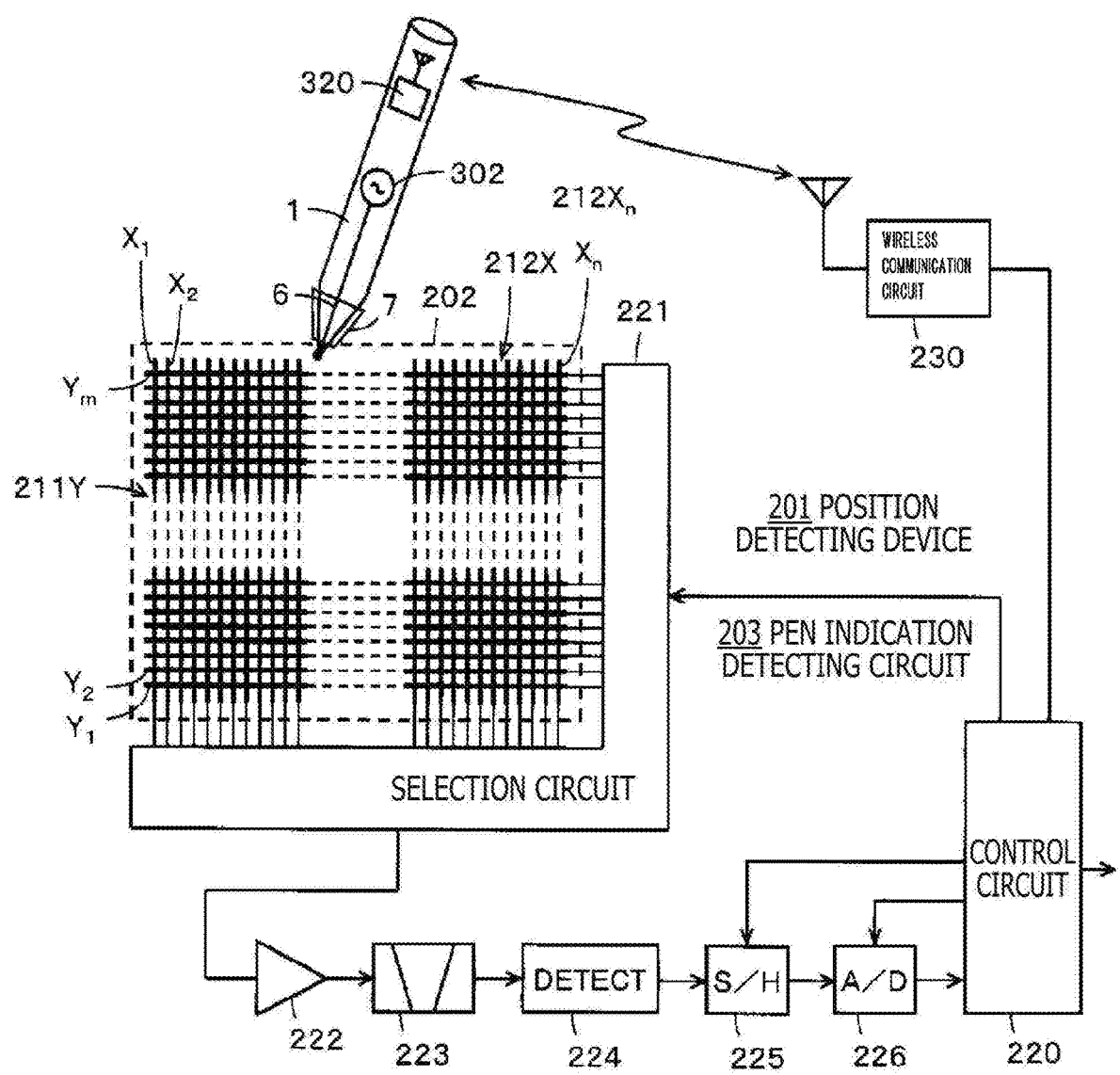
FIG. 19 is a diagram for explaining another modification example of the transmission signal generating circuit of the position indicator according to this disclosure.
Figure 20:
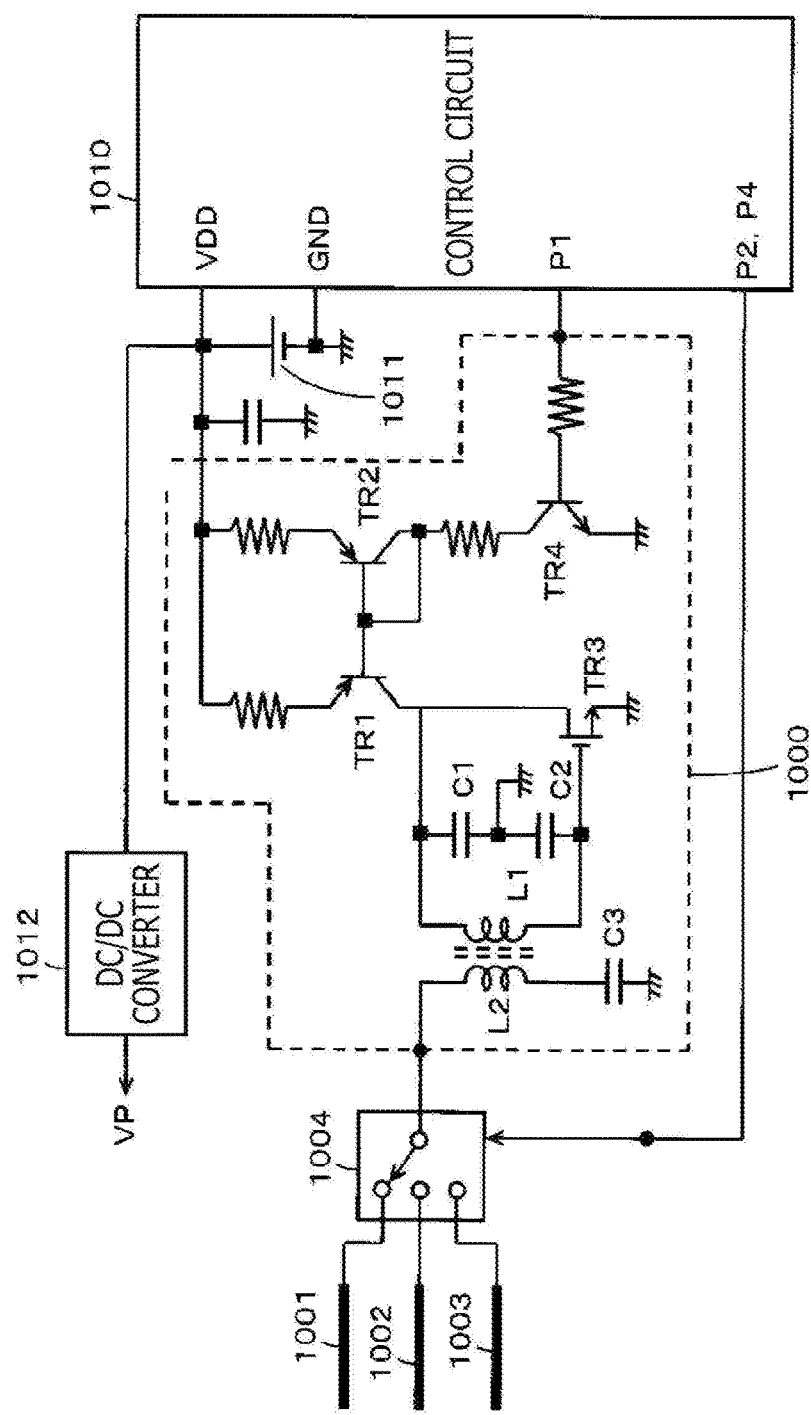
FIG. 20 is a block diagram depicting a configuration example of a transmission signal generating circuit of a conventional position indicator.

However, as depicted in FIG. 19, a wireless communication circuit 320 and a wireless communication circuit 230 configured based on, for example, Bluetooth (registered trademark) or the like may be disposed in each of the position indicator 1, 1A, or 1B and the position detecting device 201, and the above-described identification information may be transmitted as an RF (Radio Frequency) signal from the position indicator 1, 1A, or 1B to the position detecting device 201 by wireless communication through the wireless communication circuit. Although FIG. 19 is depicted as the case of the position indicator 1 or 1A and the position detecting device 201, the configuration can be similarly made also in the case of the position indicator 1B and the position detecting device 201.

Furthermore, when the configuration is made as in FIG. 19, instead of transmission of the identification information from the position indicator 1, 1A, or 1B to the position detecting device 201, an instruction signal for obtaining the tilt or rotation may be transmitted from the position detecting device 201 to the position indicator 1, 1A, or 1B through the wireless communication circuits 230 and 320, and the controller 301, 301A, or 301B of the position indicator 1, 1A, or 1B may carry out switching to a state for enabling tilt detection or rotation detection in the above-described position detecting device 201 according to the received instruction signal.

DESCRIPTION OF REFERENCE SYMBOLS 1, 1A, 1B, 1C . . . Position indicator, 6 . . . Core body, 7 . . . Ring electrode (peripheral electrode), 7A, 7Ba, 7Bb, 7Ca, 7Cb, 7Cc . . . Peripheral electrode, 30 . . . Transmission signal generating circuit, 31, 31A, 31Ba, 31Bb, 31C, 31E . . . Signal transmission control circuit, 201 . . . Position detecting device, 202 . . . Sensor, 202S . . . Input surface of the sensor, 301 . . . Controller, 302 . . . Signal generating circuit, 311 . . . Coil, 312, 315, 319 . . . Switch circuit of signal transmission control circuit, 313 . . . Floating capacitance, 314, 314Ba, 314Bb . . . Capacitance circuit, 316, 316Ba, 316Bb . . . Resonant circuit

The invention claimed is:

1. A position indicator comprising:
a housing;
a first electrode and a second electrode, wherein the first electrode and the second electrode are disposed on a side of one end of the housing, and wherein the second electrode surrounds the first electrode and the first electrode is partially exposed from the second electrode in an axial direction of the housing;
a signal generating circuit which, in operation, generates a signal supplied to at least the first electrode, a capacitive interaction between the first electrode and a sensor of a position detecting device being formed through supply of the signal to the first electrode;
a signal transmission control circuit that is coupled to the second electrode and that, in operation, controls the second electrode to change the capacitive interaction between the first electrode and the sensor formed through supply of the signal from the signal generating circuit to the first electrode,
wherein the signal transmission control circuit includes a coil having a first end and a second end,
wherein the first end of the coil is coupled to the second electrode,
wherein the signal transmission control circuit includes a switch circuit that is coupled between the second end of the coil and a reference potential,
wherein the second electrode, the coil, and the switch circuit are connected in series with the coil between the second electrode and the switch circuit,
wherein, while the switch circuit is in an on-state, the second electrode is coupled to the reference potential through the coil and the switch circuit,
wherein, while the switch circuit is in an off-state, the second electrode is not coupled to the reference potential through the coil and the switch circuit, and
wherein the signal transmission control circuit includes a controller which, in operation, provides a switching control signal to the switch circuit that causes the switch circuit to change between the on-state and the off-state.

2. The position indicator according to claim 1, wherein the signal transmission control circuit includes a capacitance circuit coupled to the second electrode and the signal transmission control circuit, in operation, controls coupling of the second electrode with a reference potential.

3. The position indicator according to claim 2, wherein the inductance circuit coil and the capacitance circuit comprise a resonant circuit.

4. The position indicator according to claim 3, wherein a resonant frequency of the resonant circuit corresponds to a frequency of the signal generated by the signal generating circuit.

5. The position indicator according to claim 1, wherein the second electrode is comprised of a plurality of electrodes surrounding the first electrode.

6. The position indicator according to claim 5, wherein the signal transmission control circuit, in operation, selectively controls the plurality of electrodes that comprise the second electrode.

7. The position indicator according to claim 6, further comprising a wireless circuit which, in operation, wirelessly transmits information indicating an electrode selection state of the signal transmission control circuit to the position detecting device.

8. The position indicator according to claim 1, further comprising a receiving circuit which, in operation, receives an instruction signal from the position detecting device, the signal transmission control circuit being controlled based on the instruction signal received by the receiving circuit.

9. A method comprising:
providing a position indicator having a housing and a first electrode and a second electrode, wherein the first electrode and the second electrode are disposed on a side of one end of the housing, wherein the second electrode surrounds the first electrode and the first electrode is partially exposed from the second electrode in an axial direction of the housing, wherein the position indicator includes a coil having a first end and a second end, wherein the first end of the coil is coupled to the second electrode, wherein the position indicator includes a switch circuit that is coupled between the second end of the coil and a reference potential, wherein the second electrode, the coil, and the switch circuit are connected in series with the coil between the second electrode and the switch circuit, wherein, while the switch circuit is in an on-state, the second electrode is coupled to the reference potential through the coil and the switch circuit, and wherein, while the switch circuit is in an off-state, the second electrode is not coupled to the reference potential through the coil and the switch circuit; and
forming a capacitive interaction between the first electrode and a sensor of a position detecting device by supplying a signal to the first electrode; and
changing the capacitive interaction between the first electrode and the sensor of the position detecting device formed by the supplying of the signal to the first electrode by coupling the second electrode with the reference potential, wherein the changing includes providing a switching control signal to the switch circuit that causes the switch circuit to change between the on-state and the off-state.

10. The method according to claim 9, wherein a resonant circuit comprised of the coil and a capacitance circuit is coupled to the second electrode and the coupling includes selectively coupling the resonant circuit with the reference potential.

11. The method according to claim 10, wherein a resonant frequency of the resonant circuit corresponds to a frequency of the signal supplied to the first electrode.

12. A position detecting device that communicates with a position indicator having a housing, and a first electrode and a second electrode, wherein the first electrode and the second electrode are disposed on a side of one end of the housing, wherein the second electrode surrounds the first electrode and the first electrode is partially exposed from the second electrode in an axial direction of the housing, wherein the position indicator includes a coil having a first end and a second end, wherein the first end of the coil is coupled to the second electrode, wherein the position indicator includes a switch circuit that is coupled between the second end of the coil and a reference potential, wherein the second electrode, the coil, and the switch circuit are connected in series with the coil between the second electrode and the switch circuit, wherein, while the switch circuit is in an on-state, the second electrode is coupled to the reference potential through the coil and the switch circuit, and wherein, while the switch circuit is in an off-state, the second electrode is not coupled to the reference potential through the coil and the switch circuit, and wherein the signal transmission control circuit includes a controller which, in operation, provides a switching control signal to the switch circuit that causes the switch circuit to change between the on-state and the off-state, the position detecting device comprising:
  a sensor that has a capacitive interaction with the position indicator; and
  a control circuit which, in operation, obtains a coordinate position indicated by the position indicator by the capacitive interaction, detects identification information included in a signal transmitted from the position indicator, and determines a control state of the second electrode of the position indicator at the coordinate position based on the identification information.

13. The position detecting device according to claim 12, wherein the control circuit, in operation, obtains one or more of a tilt value and a rotation angle of the position indicator.

* * * * *